US011849322B2

(12) United States Patent
Salkintzis et al.

(10) Patent No.: US 11,849,322 B2
(45) Date of Patent: Dec. 19, 2023

(54) DELEGATED DATA CONNECTION

(71) Applicants: Lenovo (Singapore) PTE. LTD., New Tech Park (SG); Apostolis Salkintzis, Athens (GR); Dimitrios Karampatsis, Ruislip (GB); Genadi Velev, Darmstadt (DE)

(72) Inventors: Apostolis Salkintzis, Athens (GR); Dimitrios Karampatsis, Ruislip (GB); Genadi Velev, Darmstadt (DE)

(73) Assignee: Lenovo (Singapore) Pte. Ltd., New Tech Park (SG)

( * ) Notice: Subject to any disclaimer, the term of this patent is extended or adjusted under 35 U.S.C. 154(b) by 386 days.

(21) Appl. No.: 17/266,541

(22) PCT Filed: Aug. 7, 2018

(86) PCT No.: PCT/EP2018/071317
§ 371 (c)(1),
(2) Date: Feb. 5, 2021

(87) PCT Pub. No.: WO2020/030248
PCT Pub. Date: Feb. 13, 2020

(65) Prior Publication Data
US 2021/0321258 A1 Oct. 14, 2021

(51) Int. Cl.
*H04W 76/11* (2018.01)
*H04W 12/102* (2021.01)
*H04L 9/40* (2022.01)
*H04W 12/06* (2021.01)

(52) U.S. Cl.
CPC ....... *H04W 12/102* (2021.01); *H04L 63/0884* (2013.01); *H04W 12/06* (2013.01); *H04W 76/11* (2018.02)

(58) Field of Classification Search
CPC ............................ H04W 12/102; H04W 76/11
See application file for complete search history.

(56) References Cited

U.S. PATENT DOCUMENTS

| 8,271,685 B1* | 9/2012 | Reeves ................. H04W 72/04 455/437 |
| 2015/0321641 A1* | 11/2015 | Abou Mahmoud ........................ B60R 25/2018 701/2 |
| 2019/0069321 A1* | 2/2019 | Akkarakaran ........ H04L 5/0091 |

FOREIGN PATENT DOCUMENTS

WO 2018065052 A1 4/2018

OTHER PUBLICATIONS

3GPP, "3rd Generation Partnership Project; Technical Specification Group Services and System Aspects; Architecture enhancements for non-3GPP accesses (Release 15)", 3GPP TS 23.402 V15.3.0, Mar. 2018, pp. 1-314.

(Continued)

*Primary Examiner* — Michael T Vu
(74) *Attorney, Agent, or Firm* — Kunzler Bean & Adamson

(57) ABSTRACT

Apparatuses, methods, and systems are disclosed for supporting delegated data connections. One apparatus includes a processor and a transceiver that receives an access request indicating that a remote unit requires to access a first access network. The processor determines to establish a delegated data connection in a mobile communication network for the remote unit, the delegated data connection connecting the apparatus with an external data network. The processor enables the authentication of the remote unit by converting a first authentication signaling used by the mobile communication network to a second authentication signaling used by the first access network. The processor controls the transceiver to forward data traffic between the remote unit and the external data network over the delegated data connection, wherein the delegated data connection is reserved for use by the remote unit.

20 Claims, 15 Drawing Sheets

(56) References Cited

OTHER PUBLICATIONS

PCT/EP2018/071317, "Notification of Transmittal of the International Search Report and the Written Opinion of the International Searching Authority, or the Declaration", Nov. 2, 2018, pp. 1-18.
3GPP, "3rd Generation Partnership Project; Technical Specification Group Services and System Aspects; Procedures for the 5G System; Stage 2 (Release 15)", 3GPP TS 23.502 V15.2.0, Jun. 2018, pp. 1-308.
Motorola Mobility, Lenovo, "Solution for Key Issue #3: Access to 5GC from UEs that do not support NAS", SA WG2 Meeting #127-bis S2-185617 (revision of S2-183516, 4800, 5563), May 28-Jun. 1, 2018, pp. 1-5.
3GPP, "3rd Generation Partnership Project; Technical Specification Group Services and System Aspects; Study on Architecture for Next Generation System (Release 14)", 3GPP TR 23.799 V14.0.0, Dec. 2016, pp. 1-522.
3GPP, "3rd Generation Partnership Project; Technical Specification Group Services and System Aspects; Study on the Wireless and Wireline Convergence for the 5G system architecture (Release 16)", 3GPP TR 23.716 V0.6.0, Jul. 2018, pp. 1-109.
3GPP, "3rd Generation Partnership Project; Technical Specification Group Services and System Aspects; System Architecture for the 5G System; Stage 2 (Release 15)", 3GPP TS 23.501 V15.2.0, Jun. 2018, pp. 1-217.
Motorola Mobility et al., "Update of Solution #3: Access to 5GC from UEs without supporting NAS on non-3GPP access", SA WG2 Meeting #128 S2-187004 (revision of S2-186438), Jul. 2-6, 2018, pp. 1-6.

* cited by examiner

DELEGATED DATA CONNECTION

FIELD

The subject matter disclosed herein relates generally to wireless communications and more particularly relates to supporting a delegated data connection in a mobile communication network.

BACKGROUND

The following abbreviations and acronyms are herewith defined, at least some of which are referred to within the following description.

Third Generation Partnership Project ("3GPP"), Access and Mobility Management Function ("AMF"), Access Network Performance ("ANP"), Access Point Name ("APN"), Access Stratum ("AS"), Carrier Aggregation ("CA"), Clear Channel Assessment ("CCA"), Control Channel Element ("CCE"), Channel State Information ("CSI"), Common Search Space ("CSS"), Data Network Name ("DNN"), Data Radio Bearer ("DRB"), Downlink Control Information ("DCI"), Downlink ("DL"), Enhanced Clear Channel Assessment ("eCCA"), Enhanced Mobile Broadband ("eMBB"), Evolved Node-B ("eNB"), Evolved Packet Core ("EPC"), Evolved UMTS Terrestrial Radio Access Network ("E-UTRAN"), European Telecommunications Standards Institute ("ETSI"), Frame Based Equipment ("FBE"), Frequency Division Duplex ("FDD"), Frequency Division Multiple Access ("FDMA"), Globally Unique Temporary UE Identity ("GUTI"), Hybrid Automatic Repeat Request ("HARQ"), Home Subscriber Server ("HSS"), Internet-of-Things ("IoT"), Key Performance Indicators ("KPI"), Licensed Assisted Access ("LAA"), Load Based Equipment ("LBE"), Listen-Before-Talk ("LBT"), Long Term Evolution ("LTE"), LTE Advanced ("LTE-A"), Medium Access Control ("MAC"), Multiple Access ("MA"), Modulation Coding Scheme ("MCS"), Machine Type Communication ("MTC"), Massive MTC ("mMTC"), Mobility Management ("MM"), Mobility Management Entity ("MME"), Multiple Input Multiple Output ("MIMO"), Multipath TCP ("MPTCP"), Multi User Shared Access ("MUSA"), Non-Access Stratum ("NAS"), Narrowband ("NB"), Network Function ("NF"), Network Access Identifier ("NAI"), Next Generation (e.g., 5G) Node-B ("gNB"), Next Generation Radio Access Network ("NG-RAN"), New Radio ("NR"), Policy Control & Charging ("PCC"), Policy Control Function ("PCF"), Policy Control and Charging Rules Function ("PCRF"), Packet Data Network ("PDN"), Packet Data Unit ("PDU"), PDN Gateway ("PGW"), Public Land Mobile Network ("PLMN"), Quality of Service ("QoS"), Quadrature Phase Shift Keying ("QPSK"), Registration Area ("RA"), Radio Access Network ("RAN"), Radio Access Technology ("RAT"), Radio Resource Control ("RRC"), Receive ("RX"), Switching/Splitting Function ("SSF"), Scheduling Request ("SR"), Serving Gateway ("SGW"), Session Management Function ("SMF"), System Information Block ("SIB"), Tracking Area ("TA"), Transport Block ("TB"), Transport Block Size ("TBS"), Time-Division Duplex ("TDD"), Time Division Multiplex ("TDM"), Transmission and Reception Point ("TRP"), Transmit ("TX"), Uplink Control Information ("UCI"), Unified Data Management ("UDM"), User Entity/Equipment (Mobile Terminal) ("UE"), Uplink ("UL"), User Plane ("UP"), Universal Mobile Telecommunications System ("UMTS"), Ultra-reliability and Low-latency Communications ("URLLC"), and Worldwide Interoperability for Microwave Access ("WiMAX").

In fifth generation ("5G") wireless communication systems, some UEs do not support the 5G NAS protocol over non-3GPP access and are thus unable to utilize 5G services over non-3GPP access networks.

BRIEF SUMMARY

Methods for supporting delegated data connections are disclosed. Apparatuses and systems also perform the functions of the methods. One method (e.g., of an interworking apparatus) for supporting delegated data connections includes receiving, at an apparatus, an access request indicating that a remote unit requires to access a first access network and determining to establish a delegated data connection in a mobile communication network for the remote unit connecting the apparatus with an external data network. The method includes enabling authentication of the remote unit by converting, at the apparatus, a first authentication signaling used by the mobile communication network to a second authentication signaling used by the first access network and forwarding data traffic between the remote unit and the external data network over the delegated data connection in response to successful authentication of the remote unit. Here, the delegated data connection is reserved for use by the remote unit.

Another method (e.g., of a user equipment) for supporting delegated data connections includes establishing, by the remote unit, a connection with a first access network by using a NAI and receiving a first network address for communication over the first access network. The method also includes determining that the connection with the first access network provides connectivity to an external data network via a delegated data connection in a mobile communication network. Here, the remote unit is not registered with the mobile communication network and the delegated data connection is reserved for use by the remote unit. The method includes determining to establish connectivity with the external data network via a second access network and sending a request to the mobile communication network via the second access network to establish a second connection with the external data network, wherein the request includes the NAI. In various embodiments, the method includes communicating with the external data network via the second access network using the first network address.

BRIEF DESCRIPTION OF THE DRAWINGS

A more particular description of the embodiments briefly described above will be rendered by reference to specific embodiments that are illustrated in the appended drawings. Understanding that these drawings depict only some embodiments and are not therefore to be considered to be limiting of scope, the embodiments will be described and explained with additional specificity and detail through the use of the accompanying drawings, in which:

FIG. 2A is a block diagram illustrating another embodiment of a network architecture for supporting delegated data connections;

DETAILED DESCRIPTION

Figure 1:
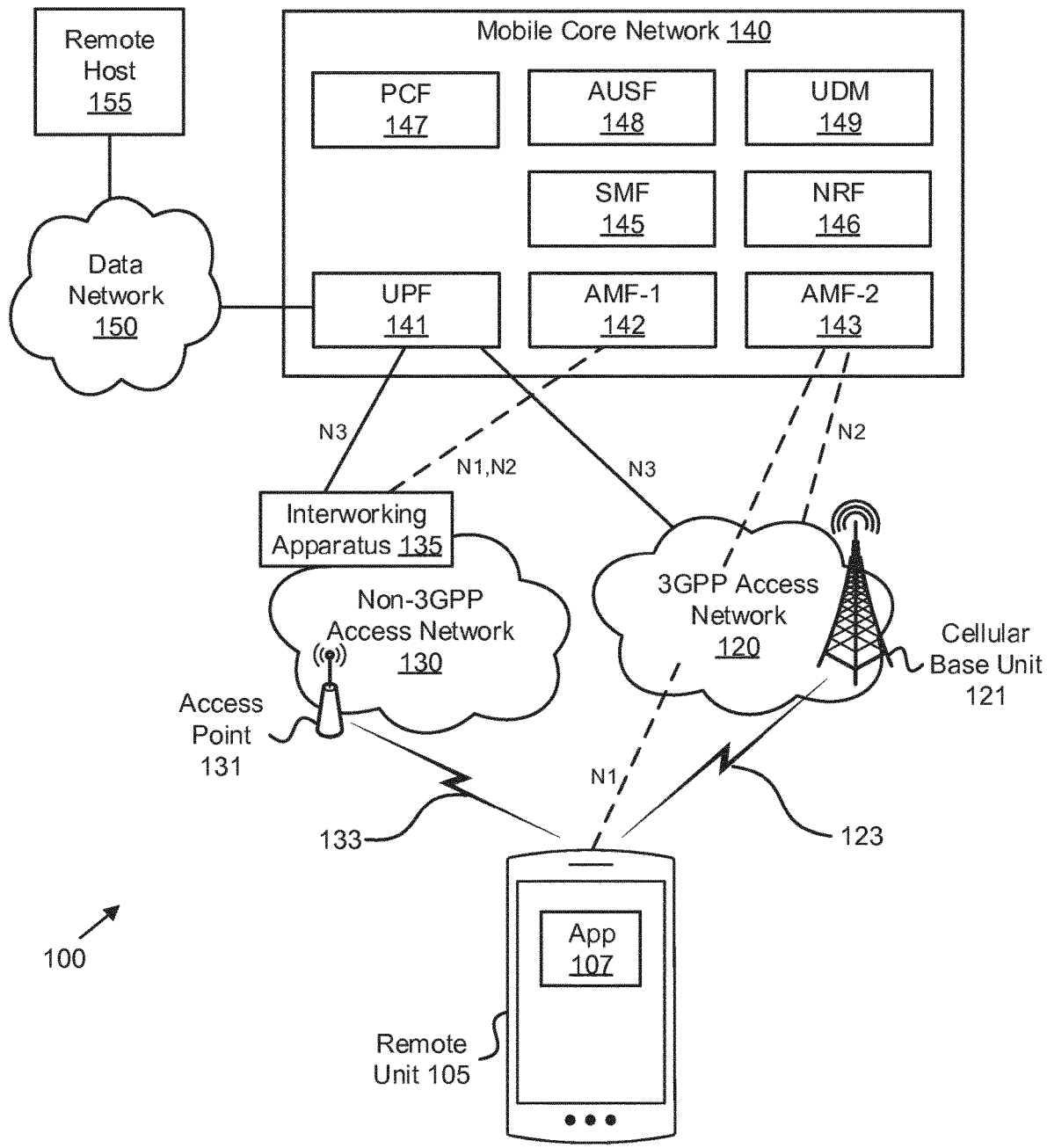
FIG. 1 is a schematic block diagram illustrating one embodiment of a wireless communication system for supporting delegated data connections.

As will be appreciated by one skilled in the art, aspects of the embodiments may be embodied as a system, apparatus, method, or program product. Accordingly, embodiments may take the form of an entirely hardware embodiment, an entirely software embodiment (including firmware, resident software, micro-code, etc.) or an embodiment combining software and hardware aspects.

For example, the disclosed embodiments may be implemented as a hardware circuit comprising custom very-large-scale integration ("VLSI") circuits or gate arrays, off-the-shelf semiconductors such as logic chips, transistors, or other discrete components. The disclosed embodiments may also be implemented in programmable hardware devices such as field programmable gate arrays, programmable array logic, programmable logic devices, or the like. As another example, the disclosed embodiments may include one or more physical or logical blocks of executable code which may, for instance, be organized as an object, procedure, or function.

Furthermore, embodiments may take the form of a program product embodied in one or more computer readable storage devices storing machine readable code, computer readable code, and/or program code, referred hereafter as code. The storage devices may be tangible, non-transitory, and/or non-transmission. The storage devices may not embody signals. In a certain embodiment, the storage devices only employ signals for accessing code.

Any combination of one or more computer readable medium may be utilized. The computer readable medium may be a computer readable storage medium. The computer readable storage medium may be a storage device storing the code. The storage device may be, for example, but not limited to, an electronic, magnetic, optical, electromagnetic, infrared, holographic, micromechanical, or semiconductor system, apparatus, or device, or any suitable combination of the foregoing.

More specific examples (a non-exhaustive list) of the storage device would include the following: an electrical connection having one or more wires, a portable computer diskette, a hard disk, a random-access memory ("RAM"), a read-only memory ("ROM"), an erasable programmable read-only memory ("EPROM" or Flash memory), a portable compact disc read-only memory ("CD-ROM"), an optical storage device, a magnetic storage device, or any suitable combination of the foregoing. In the context of this document, a computer readable storage medium may be any tangible medium that can contain, or store, a program for use by or in connection with an instruction execution system, apparatus, or device.

Reference throughout this specification to "one embodiment," "an embodiment," or similar language means that a particular feature, structure, or characteristic described in connection with the embodiment is included in at least one embodiment. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising," "having," and variations thereof mean "including but not limited to," unless expressly specified otherwise. An enumerated listing of items does not imply that any or all of the items are mutually exclusive, unless expressly specified otherwise. The terms "a," "an," and "the" also refer to "one or more" unless expressly specified otherwise.

Furthermore, the described features, structures, or characteristics of the embodiments may be combined in any suitable manner. In the following description, numerous specific details are provided, such as examples of programming, software modules, user selections, network transactions, database queries, database structures, hardware modules, hardware circuits, hardware chips, etc., to provide a thorough understanding of embodiments. One skilled in the relevant art will recognize, however, that embodiments may be practiced without one or more of the specific details, or with other methods, components, materials, and so forth. In other instances, well-known structures, materials, or operations are not shown or described in detail to avoid obscuring aspects of an embodiment.

Aspects of the embodiments are described below with reference to schematic flowchart diagrams and/or schematic block diagrams of methods, apparatuses, systems, and program products according to embodiments. It will be understood that each block of the schematic flowchart diagrams and/or schematic block diagrams, and combinations of blocks in the schematic flowchart diagrams and/or schematic block diagrams, can be implemented by code. This code may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the schematic flowchart diagrams and/or schematic block diagrams.

The code may also be stored in a storage device that can direct a computer, other programmable data processing apparatus, or other devices to function in a particular manner, such that the instructions stored in the storage device produce an article of manufacture including instructions which implement the function/act specified in the schematic flowchart diagrams and/or schematic block diagrams.

The code may also be loaded onto a computer, other programmable data processing apparatus, or other devices to cause a series of operational steps to be performed on the computer, other programmable apparatus, or other devices to produce a computer implemented process such that the code which execute on the computer or other programmable apparatus provide processes for implementing the functions/ acts specified in the schematic flowchart diagrams and/or schematic block diagram.

The schematic flowchart diagrams and/or schematic block diagrams in the Figures illustrate the architecture, functionality, and operation of possible implementations of apparatuses, systems, methods, and program products according to various embodiments. In this regard, each block in the schematic flowchart diagrams and/or schematic block diagrams may represent a module, segment, or portion of code, which includes one or more executable instructions of the code for implementing the specified logical function(s).

It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. Other steps and methods may be conceived that are equivalent in function, logic, or effect to one or more blocks, or portions thereof, of the illustrated Figures.

The description of elements in each figure may refer to elements of proceeding figures. Like numbers refer to like elements in all figures, including alternate embodiments of like elements.

Methods, apparatuses, and systems are disclosed for establishing, using, and transferring a delegated data connection in a mobile communication network. In the following descriptions, a delegated PDU Session is used as an example of a delegated data connection. However, the concepts described herein are also applicable to other types of data connections. Moreover, while the following descriptions mainly use 5GS terminology, the concepts described herein are also applicable to EPS (e.g., where the AMF is constituted by MME and UPF is constituted by SGW/PGW) or to UMTS (e.g. where the AMF is constituted by SGSN and UPF is constituted by SGSN/GGSN), etc.

FIG. 1 depicts a wireless communication system 100 for steering a data packet to a specific user-plane connection of a multi-access data connection, according to embodiments of the disclosure. In one embodiment, the wireless communication system 100 includes at least one remote unit 105, a 3GPP access network 120 containing at least one cellular base unit 121, 3GPP communication links 123, a non-3GPP access network 130 containing at least one access point 131, non-3GPP communication links 133, and a mobile core network 140. Even though a specific number of remote units 105, 3GPP access networks 120, cellular base units 121, 3GPP communication links 123, non-3GPP access networks 130, access points 131, non-3GPP communication links 133, and mobile core networks 140 are depicted in FIG. 1, one of skill in the art will recognize that any number of remote units 105, 3GPP access networks 120, cellular base units 121, 3GPP communication links 123, non-3GPP access networks 130, access points 131, non-3GPP communication links 133, and mobile core networks 140 may be included in the wireless communication system 100.

In one implementation, the wireless communication system 100 is compliant with the 5G system specified in the 3GPP specifications. More generally, however, the wireless communication system 100 may implement some other open or proprietary communication network, for example, LTE or WiMAX, among other networks. The present disclosure is not intended to be limited to the implementation of any particular wireless communication system architecture or protocol.

In one embodiment, the remote units 105 may include computing devices, such as desktop computers, laptop computers, personal digital assistants ("PDAs"), tablet computers, smart phones, smart televisions (e.g., televisions connected to the Internet), smart appliances (e.g., appliances connected to the Internet), set-top boxes, game consoles, security systems (including security cameras), vehicle on-board computers, network devices (e.g., routers, switches, modems), or the like. In some embodiments, the remote units 105 include wearable devices, such as smart watches, fitness bands, optical head-mounted displays, or the like. Moreover, the remote units 105 may be referred to as subscriber units, mobiles, mobile stations, users, terminals, mobile terminals, fixed terminals, subscriber stations, UE, user terminals, a device, or by other terminology used in the art.

The remote units 105 may communicate directly with one or more of the cellular base units 121 in the 3GPP access network 120 via uplink ("UL") and downlink ("DL") communication signals. Furthermore, the UL and DL communication signals may be carried over the 3GPP communication links 123. Similarly, the remote units 105 may communicate with one or more access points 131 in the non-3GPP access network(s) 130 via UL and DL communication signals carried over the non-3GPP communication links 133. Here, the access networks 120 and 130 are intermediate networks that provide the remote units 105 with access to the mobile core network 140.

In some embodiments, the remote units 105 communicate with a remote host 155 via a network connection with the mobile core network 140. For example, an application 107 (e.g., web browser, media client, telephone/VoIP application) in a remote unit 105 may trigger the remote unit 105 to establish a PDU session (or other data connection) with the mobile core network 140 using a 3GPP access network 120 and/or a non-3GPP access network 130. The mobile core network 140 then relays traffic between the remote unit 105 and the data network 150 (e.g., the remote host 155 in the data network 150) using the PDU session. Note that the remote unit 105 may establish one or more PDU sessions (or other data connections) with the mobile core network 140.

The cellular base units 121 may be distributed over a geographic region. In certain embodiments, a cellular base unit 121 may also be referred to as an access terminal, a base, a base station, a Node-B, an eNB, a gNB, a Home Node-B, a relay node, a device, or by any other terminology used in the art. The cellular base units 121 are generally part of a radio access network ("RAN"), such as the 3GPP access network 120, that may include one or more controllers communicably coupled to one or more corresponding cellular base units 121. These and other elements of radio access network are not illustrated but are well known generally by those having ordinary skill in the art. The cellular base units 121 connect to the mobile core network 140 via the 3GPP access network 120.

The cellular base units 121 may serve a number of remote units 105 within a serving area, for example, a cell or a cell sector, via a wireless communication link 123. The cellular base units 121 may communicate directly with one or more of the remote units 105 via communication signals. Generally, the cellular base units 121 transmit DL communication signals to serve the remote units 105 in the time, frequency, and/or spatial domain. Furthermore, the DL communication signals may be carried over the 3GPP communication links 123. The 3GPP communication links 123 may be any suitable carrier in licensed or unlicensed radio spectrum. The 3GPP communication links 123 facilitate communication between one or more of the remote units 105 and/or one or more of the cellular base units 121.

The non-3GPP access networks 130 may be distributed over a geographic region. Each non-3GPP access network 130 may serve a number of remote units 105 with a serving area. Typically, a serving area of the non-3GPP access network 130 is smaller than the serving area of a cellular base unit 121. An access point 131 in a non-3GPP access network 130 may communicate directly with one or more remote units 105 by receiving UL communication signals and transmitting DL communication signals to serve the remote units 105 in the time, frequency, and/or spatial domain. Both DL and UL communication signals are carried over the non-3GPP communication links 133. The 3GPP communication links 123 and non-3GPP communication links 133 may employ different frequencies and/or different communication protocols. In various embodiments, an access point 131 may communicate using unlicensed radio spectrum. The mobile core network 140 may provide services to a remote unit 105 via the non-3GPP access networks 130, as described in greater detail herein.

In some embodiments, a non-3GPP access network 130 connects to the mobile core network 140 via an interworking function 135. The interworking function 135 provides interworking between the non-3GPP access network 130 and the mobile core network 140, supporting connectivity via the "N2" and "N3" interfaces. As depicted, both the 3GPP access network 120 and the interworking function 135 communicate with the AMFs 142, 143 using a "N2" interface and with the UPF 141 using a "N3" interface.

Moreover, where the remote unit 105 does not support the 5G NAS protocol over the non-3GPP access network 130 and, thus, they are not capable of establishing signaling connections with the (e.g., 5GC) mobile core network 140 via the non-3GPP access network 130. In various embodiments, a remote unit 105 may support 5G NAS signaling over the 3GPP access network 120 without supporting the same 5G NAS protocol over the non-3GPP access network 130. As described in further detail herein, the interworking function 135 may implement a NAS signaling interface (e.g., using a "N1" interface), which can be used to create a data connection for the remote unit 105 that does not support the 5G NAS protocol over the non-3GPP access network 130 (such a remote unit may be referred to as being "non-5G-capable over non-3GPP").

In certain embodiments, a non-3GPP access network 130 may be controlled by an operator of the mobile core network 140 and may have direct access to the mobile core network 140. Such a non-3GPP AN deployment is referred to as a "trusted non-3GPP access network." A non-3GPP access network 130 is considered as "trusted" when it is operated by the 3GPP operator, or a trusted partner, and supports certain security features, such as strong air-interface encryption. In contrast, a non-3GPP access network 130 deployment that is not controlled by an operator (or trusted partner) of the mobile core network 140, does not have direct access to the mobile core network 140, or does not support the certain security features is referred to as a "non-trusted" non-3GPP access network.

In one embodiment, the mobile core network 140 is a 5G core ("5GC") or the evolved packet core ("EPC"), which may be coupled to a data network 150, like the Internet and private data networks, among other data networks. A remote unit 105 may have a subscription or other account with the mobile core network 140. Each mobile core network 140 belongs to a single public land mobile network ("PLMN"). The present disclosure is not intended to be limited to the implementation of any particular wireless communication system architecture or protocol.

The mobile core network 140 includes several network functions ("NFs"). As depicted, the mobile core network 140 includes multiple user plane functions ("UPFs"). Here, the mobile core network 140 includes at least one user plane function ("UPF") 141. In various embodiments, the UPF 141 serves both the 3GPP access network 120 and the non-3GPP access network 130. In other embodiments, a different UPF in the mobile core network 140 may serve the 3GPP access network 120 than serves the non-3GPP access network 130.

The mobile core network 140 also includes multiple control plane functions including, but not limited to, a first Access and Mobility Management Function ("AMF-1") 142 that serves the non-3GPP access network 130, a second AMF ("AMF-2") 143 that serves the 3GPP access network 120, a Session Management Function ("SMF") 145, an Authentication Server Function ("AUSF") 147, a Policy Control Function ("PCF") 148, and a Unified Data Management function ("UDM") 149. In certain embodiments, the mobile core network 140 may also include a Network Repository Function ("NRF") 146 used by the various NFs to discover and communicate with each other over APIs. Although specific numbers and types of network functions are depicted in FIG. 1, one of skill in the art will recognize that any number and type of network functions may be included in the mobile core network 140. For example, while different AMFs are depicted serving the 3GPP access network 120 and the non-3GPP access network 130, in other embodiments, both the 3GPP access network 120 and the non-3GPP access network 130 may be served by the same AMF.

As depicted, the remote unit 105 may choose to connect to a non-3GPP access network 130. If the remote unit 105 does not support a suitable signaling protocol (e.g., 5G NAS) over non-3GPP access (e.g., the remote unit is non-5G-capable over non-3GPP), then the interworking function 135 may establish a "proxy" or "delegated" data connection (e.g., PDU session) with the mobile core network 140 for use by the remote unit 105. Thus, the interworking function 135 enables those remote units 105 which are non-5G-capable over non-3GPP access, to establish connectivity to the 5G core ("5GC", e.g., the mobile network core 140) and utilize its services (e.g., 5G services).

A "delegated" PDU session is a PDU session requested by a first entity (e.g., an interworking function 135) that is going to carry the traffic of a second entity (e.g., remote unit 105) different from the first entity, after the second entity is authenticated (by 5GC) and after is authorized (by 5GC) to use the PDU session requested by the first entity. The first entity (interworking function 135) is the "controller" of the delegated PDU session, while the second entity (remote unit 105) is the "user" of the delegated PDU session. When the controller requests a delegated PDU session, the user of the delegated PDU session is authenticated/authorized before the delegated PDU session is established; however, the user (e.g., remote unit 105) is not registered in the 5GC. In the context of this disclosure, the "user" of the delegated PDU session is a remote unit 105 that is non-5G-capable over non-3GPP access.

In a normal PDU session (i.e. in a PDU session specified in the 3GPP Rel-15 specifications) the controller and the user of the PDU session are usually same entity. Moreover, a delegated PDU session is distinct from a data tethering in which a UE may establish a PDU session which can carry the traffic of other devices. A typical example is when a UE activates Bluetooth tethering or mobile hotspot functionality to share its mobile data connection (i.e. its PDU session) and allows other devices to establish connectivity via a mobile data network. One difference of this "tethered" PDU session with a "delegated" PDU is that a tethered PDU is open to use by many users, whereas a delegated PDU session is restricted to only one user (e.g., the user authenticated/ authorized by the 5GC). Another difference is that the user of the delegated PDU session is successfully authenticated by the mobile network (e.g., 5GC) and is authorized to use the PDU session prior to the delegated PDU session being established, but users of the tethered PDU session are not authenticated/authorized before the tethered. PDU session is established.

One advantage of the "delegated" or "proxy" PDU session is that it does not require the non-5G-capable UEs to be registered to 5GC. Thus, providing a delegated PDU to the remote unit 105 is simpler, it can be deployed easier, and does not require the remote units 105 to possess USIM-based credentials. Although the non-5G-capable UEs are authenticated by the 5GC before 5G connectivity is established, the type of credentials to be used is flexible and not necessarily USIM-based credentials. Moreover, any suitable type of authentication method may be used, including, but not limited to EAP-AKA.

Figure 2A:
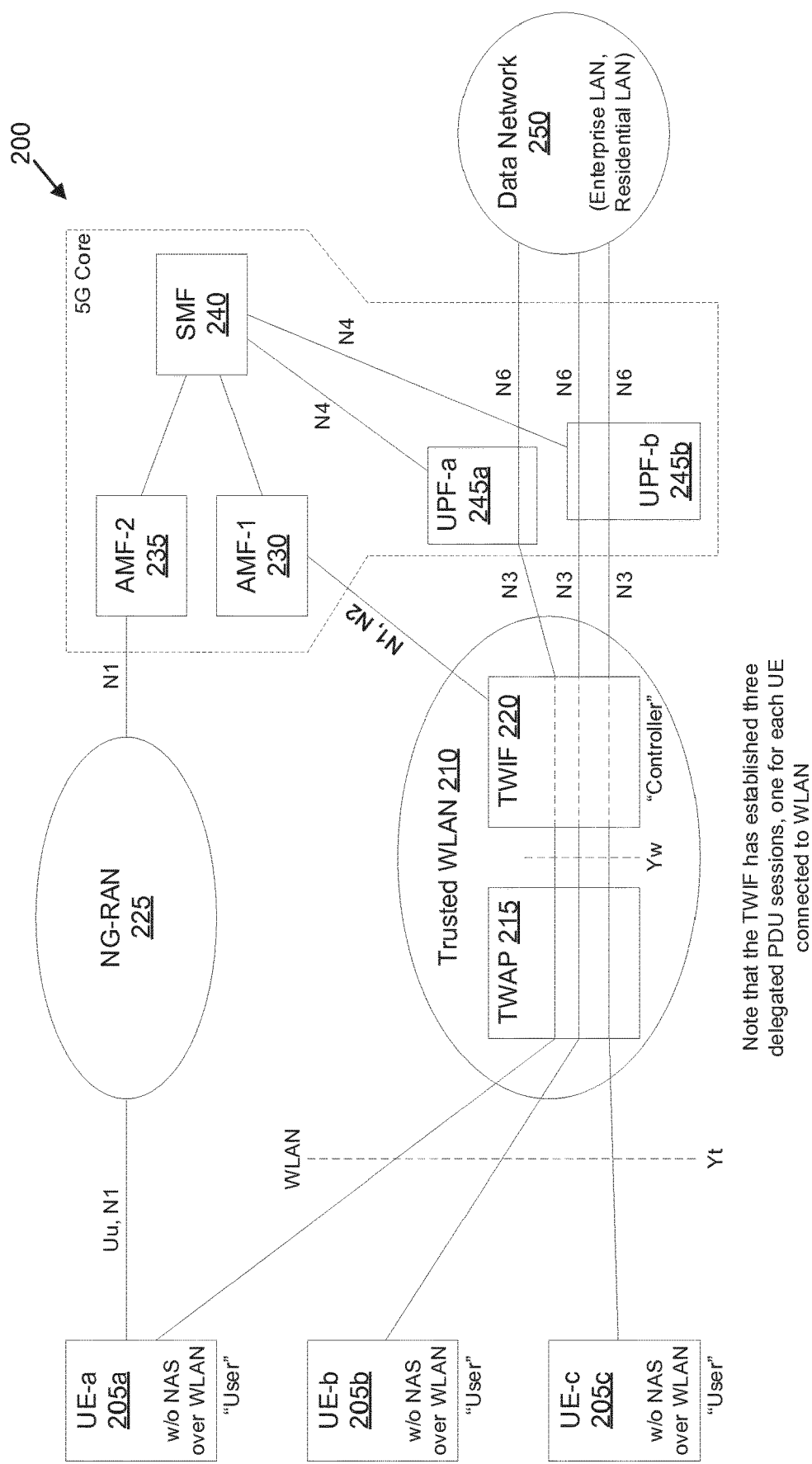
FIG. 2A is a block diagram illustrating one embodiment of a network architecture for supporting delegated data connections.
Figure 2B:
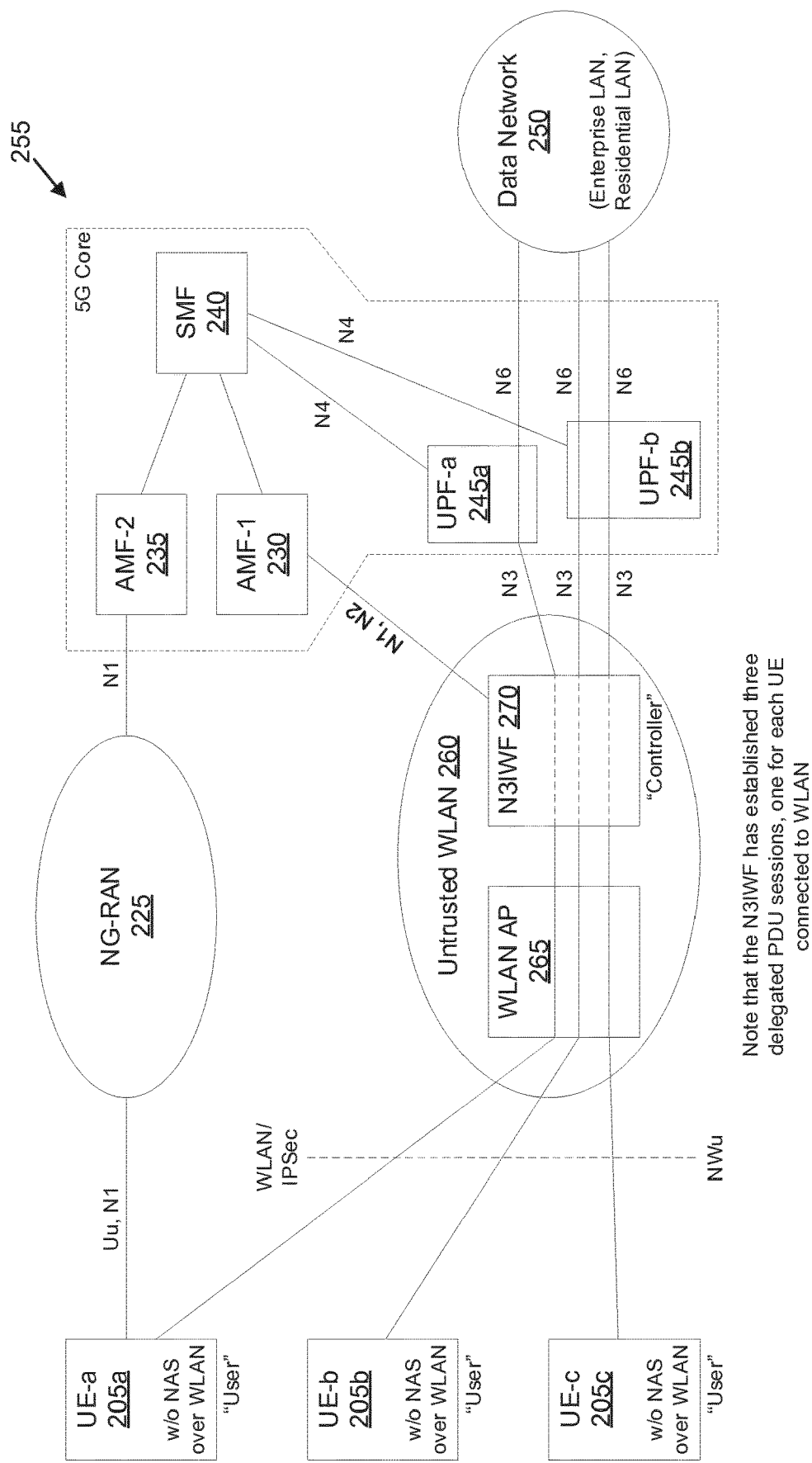
FIG. 2C is a block diagram illustrating a third embodiment of a network architecture for supporting delegated data connections.
Figure 2C:
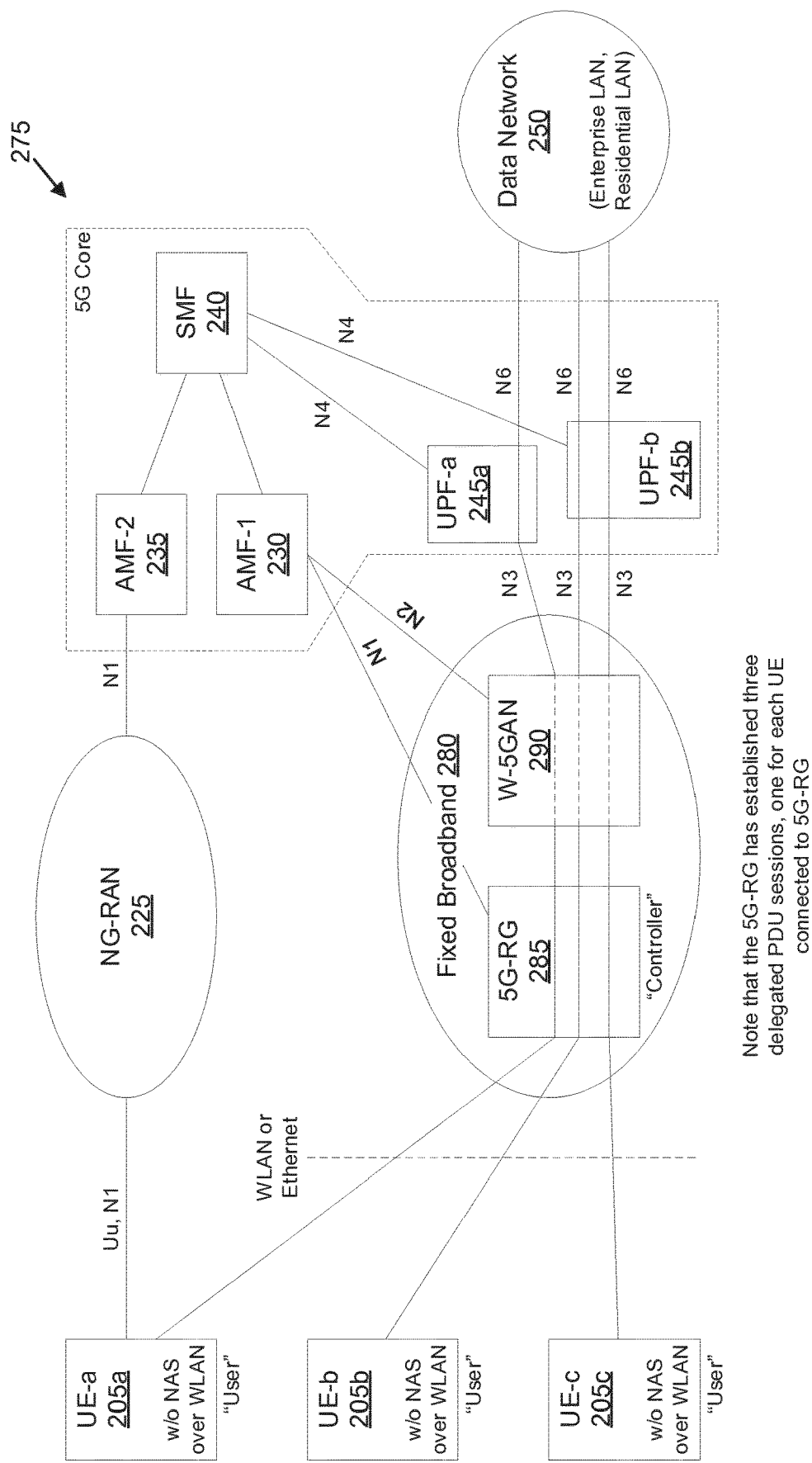

FIGS. 2A-2C depict various network architectures used for delegated data connections, according to embodiments of the disclosure. Each depicted network architecture may be a simplified embodiment of the wireless communication system 100. In FIG. 2A, the non-3GPP access network 130 is embodied by the trusted WLAN 210. In FIG. 2B, the non-3GPP access network 130 is embodied by the untrusted WLAN 260. In FIG. 2C, the non-3GPP access network 130 is embodied by the fixed broadband network 280. In FIGS. 2A-2C, the 3GPP access network 120 is embodied by the NG-RAN 225.

FIG. 2A depicts a first network architecture 200. The first network architecture 200 includes at least a first UE ("UE-a") 205a, a second UE ("UE-b") 205b, and a third UE ("UE-c") 205c, the various UEs referred to collectively, or individually, as UE(s) 205. In the depicted embodiments, the UEs 205 are non-5G-capable over non-3GPP access, meaning they do not support 5G-NAS over WLAN. The first network architecture 200 also includes the trusted WLAN 210, the NG-RAN 225, a first AMF 230, a second AMF 235, a SMF 240, a first UPF ("UPF-a") 245a, a second UPF ("UPF-b") 245b, and a DN 250. The UPF-a 245a and UPF-b 245b may be referred to collectively, or individually, as UPF(s) 245.

The trusted WLAN 210 includes a trusted WLAN AP ("TWAP") 215 and a trusted WLAN interworking function ("TWIF") 220. The TWAP 215 may be one embodiment of the access point 131 in the non-3GPP access network 130. The TWIF 220 may be one embodiment of the interworking function 135, described above. The UE 205 may be one embodiment of the remote unit 105, described above. The AMFs 230, 235, the SMF 240, the UPF 245, and the DN 250 may be embodiments of the AMFs 142, 143, the SMF 145, the UPF 141, and the DN 150, respectively.

The TWIF 220 establishes one or more delegated PDU sessions, or other delegated data connections, on behalf of a UE 205 connecting to the trusted WLAN 210. The delegated PDU sessions allow the UEs 205 to communicate with the data network 250 via the WLAN and 5G core network. Here, the TWIF 220 acts as the "controller" of the delegated PDU session(s), while the UE 205 is the "user" of the delegated PDU session. As the controller, the TWIF 220 is the endpoint of the N1 signaling connection of the delegated PDU session. Recall that the UEs 205 are non-5G-capable over non-3GPP access, thus the UEs 205 cannot support an N1 signaling connection over WLAN. Thus, in contrast to a "normal" PDU session, the user plane path and control plane path of the delegated PDU session terminate at different entities (e.g., the UE 205 and TWIF 220, respectively; hence the designations "user" and "controller" for a delegated PDU session. In the depicted embodiment, the TWIF 220 has established three delegated PDU session, one for each of the UEs 205a-c connected to the trusted WLAN 210. The TWIF 220 exchanges N1 signaling with the 5G core ("5GC").

The TWIF 220 enables the UEs 205 to establish 5G connectivity via the trusted WLAN 210, even though the UEs 205 do not support the 5G NAS protocol over WLAN. In other words, the UEs 205 cannot support an N1 signaling connection over WLAN and, thus, they can request neither 5GC registration, nor PDU session establishment. Note, however, that the UEs 205 may be 5G-capable over the NG-RAN 225 (a 5G radio access network), thus, they might be able to support an N1 signaling connection via the NG-RAN 225. Accordingly, the first network architecture 200 may enable, e.g., laptops and embedded devices which do not implement the 5G NAS protocol, to establish 5G connectivity and access 5G services, e.g. access an enterprise LAN or residential LAN (represented by the data network 250), access 5G operator-hosted services, access the Internet (represented by the data network 250) via the operator's security services, etc.

FIG. 2B depicts a second network architecture 255. The second network architecture 255 include many of the same entities as the first network architecture and provides similar capabilities. However, in FIG. 2B the UEs 205 connect to an untrusted WLAN 260, rather than the trusted WLAN 210. As depicted, the untrusted WLAN 260 includes a WLAN AP 265 and a N3IWF 270. The WLAN AP 265 may be one embodiment of the access point 131 in the non-3GPP access network 130. The N3IWF 270 may be one embodiment of the interworking function 135, described above. The N3IWF 270 exchanges N1 signaling with the 5GC.

Because of the untrusted WLAN 260, the UEs 205 establish IPsec connections with the N3IWF 270 in order to protect their communication. When a new IPsec connection is requested by a UE 205, the N3IWF 270 may be triggered to establish a delegated PDU session for this UE 205. Although an untrusted WLAN 260 is shown in FIG. 2B, in other embodiments, any type of non-3GPP access can be used, including Ethernet access, Bluetooth access, etc.

FIG. 2C depicts a third network architecture 275. The third network architecture 275 include many of the same entities as the first and second network architectures and provides similar capabilities. However, in FIG. 2C the UEs 205 connect to a fixed broadband network 280, rather than the trusted WLAN 210 or untrusted WLAN 260. Note that the UEs 205 may use WLAN, Ethernet, or other suitable access technology to connect to the fixed broadband network 280. As depicted, the fixed broadband network 280 includes a 5G residential gateway ("5G-RG") 285 and a Wireline 5G Access Network ("W-5GAN") 270. The 5G-RG 285 may be one embodiment of the access point 131 and the interworking function 135. Here, the 5G-RG 285 is a Residential ("RG") capable of connecting to 5GC, playing the role of a UE with regard to the 5GC. The 5G-RG 285 supports secure element and exchanges N1 signaling with the 5GC. The W-5GAN 290 is a wireline AN that connects to the 5GC via N2 and N3 interfaces (reference points). When a UE 205 behind the 5G-RG 285 attempts to connect to the 5G-RG 285, the 5G-RG 285 may be triggered to establish a delegated PDU session for this UE 205.

Figure 3:
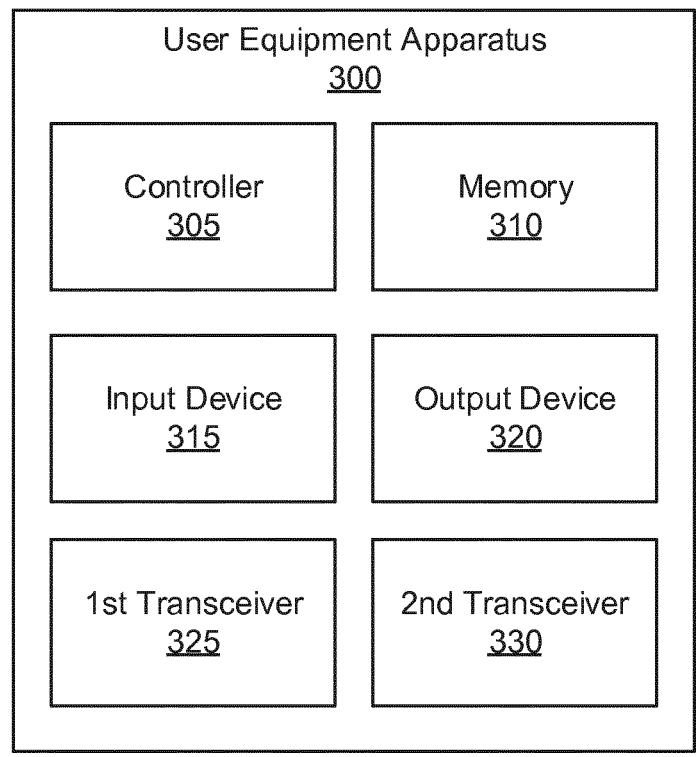
FIG. 3 is a schematic block diagram illustrating one embodiment of a user equipment apparatus for supporting delegated data connections.

FIG. 3 depicts one embodiment of a user equipment apparatus 300 that may be used for supporting a delegated data connection, according to embodiments of the disclosure. The user equipment apparatus 300 may be one embodiment of the remote unit 105. Furthermore, the user equipment apparatus 300 may include a processor 305, a memory 310, an input device 315, an output device 320, a first transceiver 325, and a second transceiver 330.

The first transceiver 325 communicates with a mobile communication network (e.g., the mobile core network 140) over a first access network, while the second transceiver 330 communicates with the mobile communication network over a second access network. The first and second access networks facilitate communication between the mobile core network 140 and the user equipment apparatus 300. In various embodiments, the first access network may be the trusted WLAN 210, the untrusted WLAN 260, the second access network is the NG-RAN 225 or other 3GPP access network 120 and the fixed broadband network 280, or other non-3GPP access network 130. Each transceiver 325, 330 may include at least one transmitter and at least one receiver. Additionally, the transceivers 325, 330 may support at least one network interface, such as an "Uu" interface used for communications between a remote unit 105 and the 3GPP access network 120.

The processor 305, in one embodiment, may include any known controller capable of executing computer-readable instructions and/or capable of performing logical operations. For example, the processor 305 may be a microcontroller, a microprocessor, a central processing unit ("CPU"), a graphics processing unit ("GPU"), an auxiliary processing unit, a field programmable gate array ("FPGA"), or similar programmable controller. In some embodiments, the processor 305 executes instructions stored in the memory 310 to perform the methods and routines described herein. The processor 305 is communicatively coupled to the memory 310, the input device 315, the output device 320, the first transceiver 325, and the second transceiver 330.

In various embodiments, the processor 305 establishes a connection with a first access network by using a NAI and receiving a first network address (e.g., IP address) for communication over the first access network. In certain embodiments, the processor 305 controls the first transceiver 325 to communicate with the first access network (e.g., to establish the connection). In one example, the processor 305 establishes a connection with a WLAN (such as the trusted WLAN 210) and receives a first IP address. Moreover, establishing the connection may include the processor 305 performing an authentication using the NAI and associated credentials.

Moreover, the processor 305 determines that the connection with the first access network provides connectivity to an external data network via a delegated data connection in a mobile communication network. Here, the remote unit is not registered with the mobile communication network and the delegated data connection is reserved for use by the remote unit.

In some embodiments, the user equipment apparatus 300 is configured with a list of one or more access network identities that support delegated data connections to the mobile communication network, for example stored in the memory 310. In such embodiments, determining that the connection with a first access network provides connectivity to an external data network via a delegated data connection in a mobile communication network is based on an identity of the first access network.

In some embodiments, the processor 305 discovers an interworking capability of the first access network. For example, a WLAN may advertise several capabilities including the PLMNs it can interwork with. In such embodiments, determining that the connection with a first access network provides connectivity to an external data network via a delegated data connection in a mobile communication network is based on the discovered interworking capability. In one embodiment, the interworking capability includes a list of one or more mobile communication networks with which the first access network can establish delegated data connections.

In some embodiments, the processor 305 determines to establish connectivity with the external data network via a second access network. The processor 305 controls the second transceiver 330 to send a request to the mobile communication network via the second access network to establish a second connection with the external data network, wherein the request includes the NAI. In certain embodiments, the request to establish the second connection is a request for a normal (not delegated) PDU session over NG-RAN.

In certain embodiments, the request sent to the mobile communication network via the second access network to establish the second data connection includes a PDU Session Establishment request and comprises an indication an indication that the second data connection is to replace an existing delegated PDU Session. In various embodiments, the included NAI may trigger the mobile communication network to "substitute" the existing delegated PDU session associated with this NAI with the new PDU session over NG-RAN. In such as substitution, the second connection is associated with the first network address, so as to prevent service interruption of existing sessions (e.g., IP sessions) using the first network address.

In some embodiments, the processor 305 further authenticates the remote unit with the mobile communication network using credentials associated with the NAI prior to communicating with the external data network via the second access network using the first network address. In such embodiments, the processor 305 uses a first type of authentication signaling (e.g., 5G NAS) to authenticate via the second access network. Moreover, establishing the connection with a first access network by using the NAI may include the processor 305 authenticating with the mobile communication network via the first access network. In such embodiments, the processor 305 uses a second type of authentication signaling to authenticate via the first access network, the second type different than the first type.

In various embodiments, the processor 305 controls the second transceiver 330 to communicate with the external data network via the second access network using the first network address.

The memory 310, in one embodiment, is a computer readable storage medium. In some embodiments, the memory 310 includes volatile computer storage media. For example, the memory 310 may include a RAM, including dynamic RAM ("DRAM"), synchronous dynamic RAM ("SDRAM"), and/or static RAM ("SRAM"). In some embodiments, the memory 310 includes non-volatile computer storage media. For example, the memory 310 may include a hard disk drive, a flash memory, or any other suitable non-volatile computer storage device. In some embodiments, the memory 310 includes both volatile and non-volatile computer storage media. In some embodiments, the memory 310 stores data relating to supporting delegated data connections, for example storing network identifiers, NAI, SSID, steering rules, and the like. In certain embodiments, the memory 310 also stores program code and related data, such as an operating system ("OS") or other controller algorithms operating on the user equipment apparatus 300 and one or more software applications.

The input device 315, in one embodiment, may include any known computer input device including a touch panel, a button, a keyboard, a stylus, a microphone, or the like. In some embodiments, the input device 315 may be integrated with the output device 320, for example, as a touchscreen or similar touch-sensitive display. In some embodiments, the input device 315 includes a touchscreen such that text may be input using a virtual keyboard displayed on the touchscreen and/or by handwriting on the touchscreen. In some embodiments, the input device 315 includes two or more different devices, such as a keyboard and a touch panel.

The output device 320, in one embodiment, may include any known electronically controllable display or display device. The output device 320 may be designed to output visual, audible, and/or haptic signals. In some embodiments, the output device 320 includes an electronic display capable of outputting visual data to a user. For example, the output device 320 may include, but is not limited to, an LCD display, an LED display, an OLED display, a projector, or similar display device capable of outputting images, text, or the like to a user. As another, non-limiting, example, the output device 320 may include a wearable display such as a smart watch, smart glasses, a heads-up display, or the like. Further, the output device 320 may be a component of a smart phone, a personal digital assistant, a television, a table computer, a notebook (laptop) computer, a personal computer, a vehicle dashboard, or the like.

In certain embodiments, the output device 320 includes one or more speakers for producing sound. For example, the output device 320 may produce an audible alert or notification (e.g., a beep or chime). In some embodiments, the output device 320 includes one or more haptic devices for producing vibrations, motion, or other haptic feedback. In some embodiments, all or portions of the output device 320 may be integrated with the input device 315. For example, the input device 315 and output device 320 may form a touchscreen or similar touch-sensitive display. In other embodiments, all or portions of the output device 320 may be located near the input device 315.

As discussed above, the first transceiver 325 communicates with a mobile communication network via a first access network, while the second transceiver 330 communicates with the mobile communication network via a second access network. The transceivers 325 and 330 operate under the control of the processor 305 to transmit messages, data, and other signals and also to receive messages, data, and other signals. For example, the processor 305 may selectively activate one or both of the transceivers 325, 330 (or portions thereof) at particular times in order to send and receive messages.

The first transceiver 325 may include one or more transmitters and one or more receivers for communicating over the first access network. In various embodiments, the one or more transmitters and one or more receivers share common circuitry and/or share a common housing. In other embodiments, the first transceiver 325 may be a transmitter-receiver, where the one or more transmitters and one or more receivers communicate with a common entity (e.g., the same access network) without having circuitry or housing in common. Similarly, the second transceiver 330 may include one or more transmitters and one or more receivers for communicating over the second access network, the one or more transmitters and one or more receivers sharing circuitry/housing or having separate circuitry/housing. As discussed above, the first transceiver 325 and the second transceiver 330 may support one or more the network interfaces for communicating with the mobile communication network.

In certain embodiments, the first transceiver 325 and second transceiver 330 may share transceiver hardware and/or circuitry. For example, the first transceiver 325 and second transceiver 330 may share antenna(s), antenna tuner(s), amplifier(s), filter(s), oscillator(s), mixer(s), modulator/demodulator(s), power supply, and the like. In one embodiment, the first transceiver 325 and second transceiver 330 are logical components using different communication protocols or protocol stacks, while using common physical hardware. In some embodiments, the first transceiver 325 and second transceiver 330 may be implemented using a common modem chip.

Figure 4:
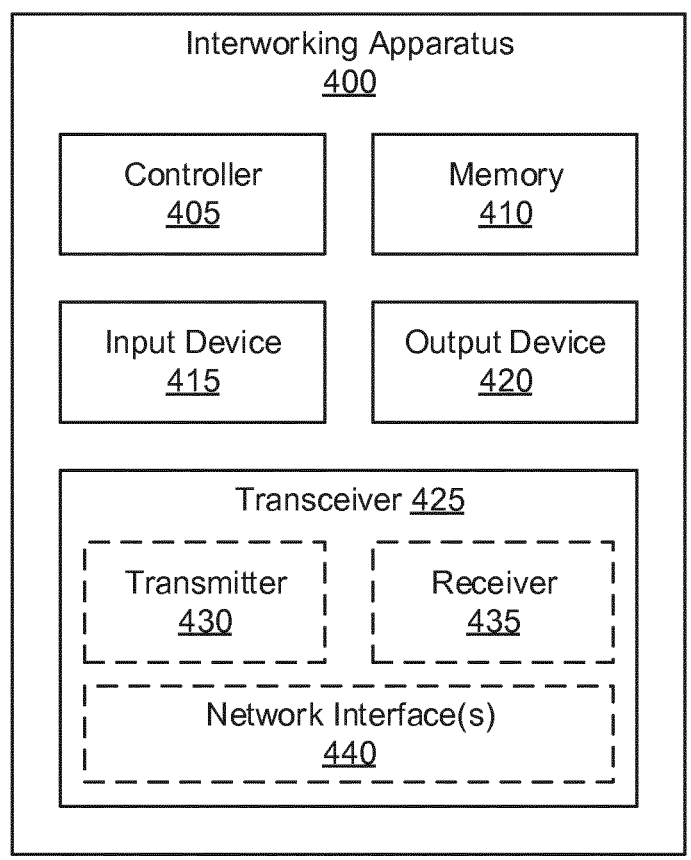
FIG. 4 is a schematic block diagram illustrating one embodiment of an interworking apparatus for supporting delegated data connections.

FIG. 4 depicts one embodiment of an interworking apparatus 400 that may be used for supporting a delegated data connection, according to embodiments of the disclosure. In some embodiments, the interworking apparatus 400 may be one embodiment of the interworking apparatus 135, the TWIF 220, the N3IWF 270, and/or the 5G-RG 285.

Furthermore, the interworking apparatus 400 may include a processor 405, a memory 410, an input device 415, an output device 420, and a transceiver 425. In some embodiments, the input device 415 and the output device 420 are combined into a single device, such as a touchscreen. In certain embodiments, the interworking apparatus 400 may not include any input device 415 and/or output device 420.

As depicted, the transceiver 425 includes at least one transmitter 430 and at least one receiver 435. Additionally, the transceiver 425 may support at least one network interface 440, such as an "N3" interface used for communications between a user plane function (e.g., the UPF 141 and/or UPF 245) and an access network node (e.g., the base unit 110 and/or (R)AN node), an "N4" interface used for communications between a session management function (e.g., the SMF 145) and a UPF, an "N6" interface used for communications between a UPF and an application function, and the like.

The processor 405, in one embodiment, may include any known controller capable of executing computer-readable instructions and/or capable of performing logical operations. For example, the processor 405 may be a microcontroller, a microprocessor, a central processing unit ("CPU"), a graphics processing unit ("GPU"), an auxiliary processing unit, a field programmable gate array ("FPGA"), or similar programmable controller. In some embodiments, the processor 405 executes instructions stored in the memory 410 to perform the methods and routines described herein. The processor 405 is communicatively coupled to the memory 410, the input device 415, the output device 420, and the transceiver 425.

In various embodiments, the processor 405 receives an access request indicating that a remote unit requires to access a first access network, such as the WLAN. The processor 305 determines to establish a delegated data connection in a mobile communication network for the remote unit connecting the apparatus with an external data network. Here, the external data network may be identified by a DNN included in the access request. In various embodiments, the first access network is a non-3GPP network, such as a WLAN. In one embodiment, the access request is an AAA Request. In another embodiment, the access request is an IKE_AUTH request.

The processor 405 enables authentication of the remote unit by converting, at the apparatus, a first type of authentication signaling used by the mobile communication network to a second type of authentication signaling used by the first access network. The processor 305 forwards data traffic between the remote unit and the external data network over the delegated data connection in response to successful authentication of the remote unit. Here, the delegated data connection is reserved for use by the remote unit.

In some embodiments, the processor 405 registers the apparatus with the mobile communication network using a first set of credentials, said registration occurring prior to receiving the access request, wherein the remote unit is not registered with the mobile communication network. In certain embodiments, registering the apparatus with the mobile communication network including sending an indication that the apparatus supports delegated data connections in the mobile communication network. In certain embodiments, the registration uses a "special" registration to indicate that the apparatus wants to establish delegated data connections in the mobile communication network. Here, each delegated data connection is reserved to carry the data traffic of a remote unit.

In various embodiments, the access request received by the apparatus includes a NAI. In such embodiments, the determination to establish the delegated data connection is based on the NAI. For example, the determination may be based on the presence of keyword in the username of the NAI. As another example, the determination may be based on the presence of a special realm in the NAI.

In some embodiments, the access request received by the apparatus indicates a SSID. In such embodiments, the determination to establish the delegated data connection may be based on the SSID. In some embodiments, the access request received by the apparatus indicates at least one of a DNN and a S-NSSAI. In such embodiments, the determination to establish the delegated data connection may be based on the at least one of a DNN and S-NSSAI.

In some embodiments, the processor 405 controls the transceiver 425 to send a PDU Session Establishment request to the mobile communication network in response to determining to establish the delegated data connection for the remote unit. In such embodiments, the PDU Session Establishment request indicates that the requested PDU Session is for an initial delegated PDU Session. Recall that the delegated data connection (e.g., delegated PDU Session) is to carry data of the remote unit (and not of other UEs). In one embodiment, the PDU Session Establishment request includes a NAI of the remote unit.

In certain embodiments, the processor 405 receives a PDU Session Resource Setup Request message for the delegated PDU Session, the PDU Session Resource Setup Request message including a PDU Session Establishment Accept message, the NAI of the remote unit and a MSK. Here, the MSK is used to protect the data traffic between the remote unit and the first access network. In certain embodiments, the PDU Session Establishment request includes a session identifier having a special value to indicate that the requested PDU Session is a delegated PDU Session used to carry the data of the remote unit.

In certain embodiments, the processor 405 receives one or more traffic steering rules for data traffic of the remote unit. In such embodiments, forwarding data traffic between the remote unit and the external data network over the delegated data connection includes sending certain data over the delegated data connection based on the one or more traffic steering rules and offloading other data to a local connection.

In certain embodiments, the processor 405 receives an indication that the remote unit is disconnected from the first access network or is not reachable in the first access network and sending a PDU Session release request to the mobile communication network, the PDU Session release request including a NAI of the remote unit. In certain embodiments, the processor 405 receives an indication that a PDU Session associated with the NAI of the remote unit has been established via a second access network and releases the delegated data connection associated with the NAI and corresponding resources in the first access network.

In certain embodiments, the apparatus operates as a fixed UE in the mobile communication network and performs session management control signaling on behalf of the remote unit. In some embodiments, the remote unit is incapable of authenticating with the mobile communication network over the first access network (e.g., non-5G-capable over WLAN) using the first type of authentication signaling (e.g., 5G NAS signaling).

In some embodiments, the processor 405 receives an indication that the remote unit is transferring from the first access network to a second access network. Here, the indication includes a NAI of the remote unit. In such embodiments, the processor 405 releases the delegated data connection associated with the NAI and corresponding resources in the first access network.

The memory 410, in one embodiment, is a computer readable storage medium. In some embodiments, the memory 410 includes volatile computer storage media. For example, the memory 410 may include a RAM, including dynamic RAM ("DRAM"), synchronous dynamic RAM ("SDRAM"), and/or static RAM ("SRAM"). In some embodiments, the memory 410 includes non-volatile computer storage media. For example, the memory 410 may include a hard disk drive, a flash memory, or any other suitable non-volatile computer storage device. In some embodiments, the memory 410 includes both volatile and non-volatile computer storage media. In some embodiments, the memory 410 stores data relating to supporting delegated data connections, for example storing NAIs, PDU Session IDs, and the like. In certain embodiments, the memory 410 also stores program code and related data, such as an operating system ("OS") or other controller algorithms operating on the interworking apparatus 400 and one or more software applications.

The input device 415, in one embodiment, may include any known computer input device including a touch panel, a button, a keyboard, a stylus, a microphone, or the like. In some embodiments, the input device 415 may be integrated with the output device 420, for example, as a touchscreen or similar touch-sensitive display. In some embodiments, the input device 415 includes a touchscreen such that text may be input using a virtual keyboard displayed on the touchscreen and/or by handwriting on the touchscreen. In some embodiments, the input device 415 includes two or more different devices, such as a keyboard and a touch panel.

The output device 420, in one embodiment, may include any known electronically controllable display or display device. The output device 420 may be designed to output visual, audible, and/or haptic signals. In some embodiments, the output device 420 includes an electronic display capable of outputting visual data to a user. For example, the output device 420 may include, but is not limited to, an LCD display, an LED display, an OLED display, a projector, or similar display device capable of outputting images, text, or the like to a user. As another, non-limiting, example, the output device 420 may include a wearable display such as a smart watch, smart glasses, a heads-up display, or the like. Further, the output device 420 may be a component of a smart phone, a personal digital assistant, a television, a table computer, a notebook (laptop) computer, a personal computer, a vehicle dashboard, or the like.

In certain embodiments, the output device 420 includes one or more speakers for producing sound. For example, the output device 420 may produce an audible alert or notification (e.g., a beep or chime). In some embodiments, the output device 420 includes one or more haptic devices for producing vibrations, motion, or other haptic feedback. In some embodiments, all or portions of the output device 420 may be integrated with the input device 415. For example, the input device 415 and output device 420 may form a touchscreen or similar touch-sensitive display. In other embodiments, all or portions of the output device 420 may be located near the input device 415.

The transceiver 425 communicates with one or more access network nodes and/or with one or more network functions of a mobile communication network. The transceiver 425 operates under the control of the processor 405 to transmit messages, data, and other signals and also to receive messages, data, and other signals. For example, the processor 405 may selectively activate the transceiver (or portions thereof) at particular times in order to send and receive messages. The transceiver 425 may include one or more transmitters 430 and one or more receivers 435. As discussed above, the transceiver 425 may support one or more the network interface 440 for communicating with network functions in a mobile core network.

Figure 5:
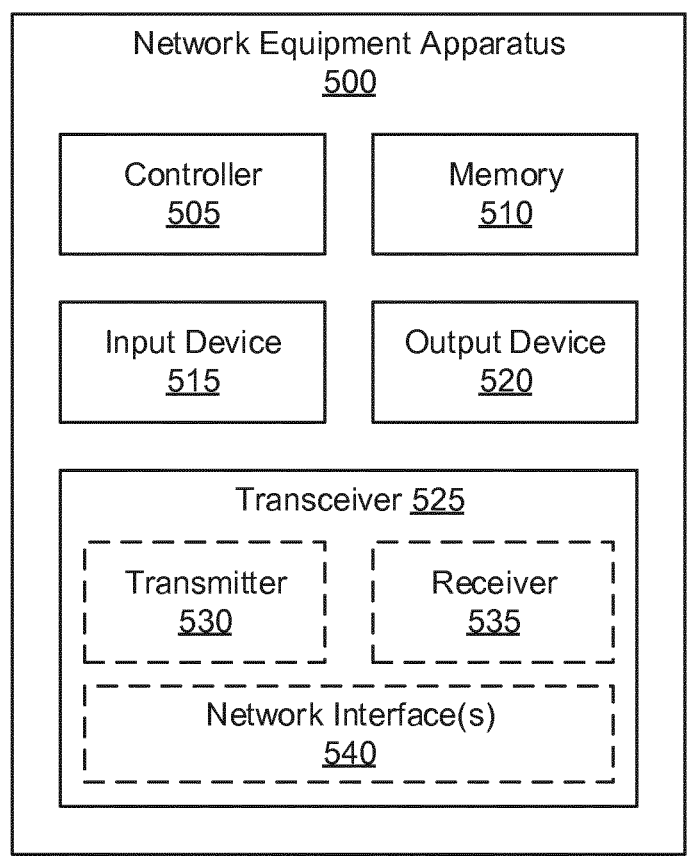
FIG. 5 is a schematic block diagram illustrating one embodiment of a network equipment apparatus for supporting delegated data connections.

FIG. 5 depicts one embodiment of a network equipment apparatus 500 that may be used for supporting delegated data connections, according to embodiments of the disclosure. In some embodiments, the interworking apparatus 400 may be one embodiment of the UPF 141 and/or UPF 225. In other embodiments, the interworking apparatus 400 may be one embodiment of the SMF 145 and/or SMF 240. Furthermore, the network equipment apparatus 500 may include a processor 505, a memory 510, an input device 515, an output device 520, and a transceiver 525. In some embodiments, the input device 515 and the output device 520 are combined into a single device, such as a touchscreen. In certain embodiments, the network equipment apparatus 500 may not include any input device 515 and/or output device 520.

As depicted, the transceiver 525 includes at least one transmitter 530 and at least one receiver 535. Additionally, the transceiver 525 may support at least one network interface 540, such as an "N3" interface used for communications between a user plane function (e.g., the UPF 141 and/or UPF 245) and an access network node (e.g., the base unit 110, interworking function 135, the TWAP 215, the TWIF 220, the WLAN AP 265, the N3IWF 270, the 5G-RG 285, the W-5GAN 290 and/or (R)AN node), an "N4" interface used for communications between a session management function (e.g., the SMF 145) and a UPF, an "N6" interface used for communications between a UPF and an application function, and the like.

The processor 505, in one embodiment, may include any known controller capable of executing computer-readable instructions and/or capable of performing logical operations. For example, the processor 505 may be a microcontroller, a microprocessor, a central processing unit ("CPU"), a graphics processing unit ("GPU"), an auxiliary processing unit, a field programmable gate array ("FPGA"), or similar programmable controller. In some embodiments, the processor 505 executes instructions stored in the memory 510 to perform the methods and routines described herein. The processor 505 is communicatively coupled to the memory 510, the input device 515, the output device 520, and the transceiver 525.

In various embodiments, the processor 505 determines whether an interworking function is authorized to establish a delegated data connection for use by a remote unit. For example, the processor 505 may receive a PDU Session Establishment request message containing an NAI of the remote unit and an indication that the request is an initial delegated request. In certain embodiments, the PDU Session Establishment request message may have a special/reserved value for the PDU Session ID, for example to indicate that the request is for a delegated PDU Session. Moreover, the processor 505 may participate in authenticating the remote unit (e.g., based on the NAI), wherein the remote unit is not registered with the mobile communication network.

In some embodiments, the transceiver 525 may receive a request to establish a new PDU session, wherein the request references the NAI of the remote unit and indicates that the request is for an existing delegated PDU Session. In such embodiments, the processor 505 may convert the delegated PDU Session into a normal (e.g., non-delegated PDU Session) that retains the same IP address.

The memory 510, in one embodiment, is a computer readable storage medium. In some embodiments, the memory 510 includes volatile computer storage media. For example, the memory 510 may include a RAM, including dynamic RAM ("DRAM"), synchronous dynamic RAM ("SDRAM"), and/or static RAM ("SRAM"). In some embodiments, the memory 510 includes non-volatile computer storage media. For example, the memory 510 may include a hard disk drive, a flash memory, or any other suitable non-volatile computer storage device. In some embodiments, the memory 510 includes both volatile and non-volatile computer storage media. In some embodiments, the memory 510 stores data relating to supporting delegated data connections, for example storing NAI, PDU Session IDs, SM Contexts, and the like. In certain embodiments, the memory 510 also stores program code and related data, such as an operating system ("OS") or other controller algorithms operating on the network equipment apparatus 500 and one or more software applications.

The input device 515, in one embodiment, may include any known computer input device including a touch panel, a button, a keyboard, a stylus, a microphone, or the like. In some embodiments, the input device 515 may be integrated with the output device 520, for example, as a touchscreen or similar touch-sensitive display. In some embodiments, the input device 515 includes a touchscreen such that text may be input using a virtual keyboard displayed on the touchscreen and/or by handwriting on the touchscreen. In some embodiments, the input device 515 includes two or more different devices, such as a keyboard and a touch panel.

The output device 520, in one embodiment, may include any known electronically controllable display or display device. The output device 520 may be designed to output visual, audible, and/or haptic signals. In some embodiments, the output device 520 includes an electronic display capable of outputting visual data to a user. For example, the output device 520 may include, but is not limited to, an LCD display, an LED display, an OLED display, a projector, or similar display device capable of outputting images, text, or the like to a user. As another, non-limiting example, the output device 520 may include a wearable display such as a smart watch, smart glasses, a heads-up display, or the like. Further, the output device 520 may be a component of a smart phone, a personal digital assistant, a television, a table computer, a notebook (laptop) computer, a personal computer, a vehicle dashboard, or the like.

In certain embodiments, the output device 520 includes one or more speakers for producing sound. For example, the output device 520 may produce an audible alert or notification (e.g., a beep or chime). In some embodiments, the output device 520 includes one or more haptic devices for producing vibrations, motion, or other haptic feedback. In some embodiments, all or portions of the output device 520 may be integrated with the input device 515. For example, the input device 515 and output device 520 may form a touchscreen or similar touch-sensitive display. In other embodiments, all or portions of the output device 520 may be located near the input device 515.

The transceiver 425 communicates with one or more access network nodes and/or with one or more network functions of a mobile communication network. The transceiver 425 operates under the control of the processor 405 to transmit messages, data, and other signals and also to receive messages, data, and other signals. For example, the processor 405 may selectively activate the transceiver (or portions thereof) at particular times in order to send and receive messages. The transceiver 425 may include one or more transmitters 430 and one or more receivers 435. As discussed above, the transceiver 425 may support one or more the network interface 440 for communicating with network functions in a mobile core network.

FIG. 6 depicts a first network procedure 600 for supporting delegated data connections, according to embodiments of the disclosure. The first network procedure 600 involves the UE 205, the trusted WLAN 210 (including the TWAP 215 and TWIF 220), the first AMF ("AMF-1") 230, the PCF 147, the UDM 149, the SMF 240, the UPF 245, the DN 250, and an AAA server 601. The first network procedure 600 may be used to establish a delegated PDU session. Note that while the trusted WLAN 210 and TWIF 220 are shown, the first network procedure 600 also applies to situations where the UE 205 connects to an untrusted WLAN 260 having a N3IWF 270, connects to a fixed broadband network 280 having a 5G-RG 285, or connects to another type of non-3GPP access network 130 having an interworking function 135. In other words, the TWIF 220 is representative of the interworking function 135 in the first network procedure 600.

Figure 6A:
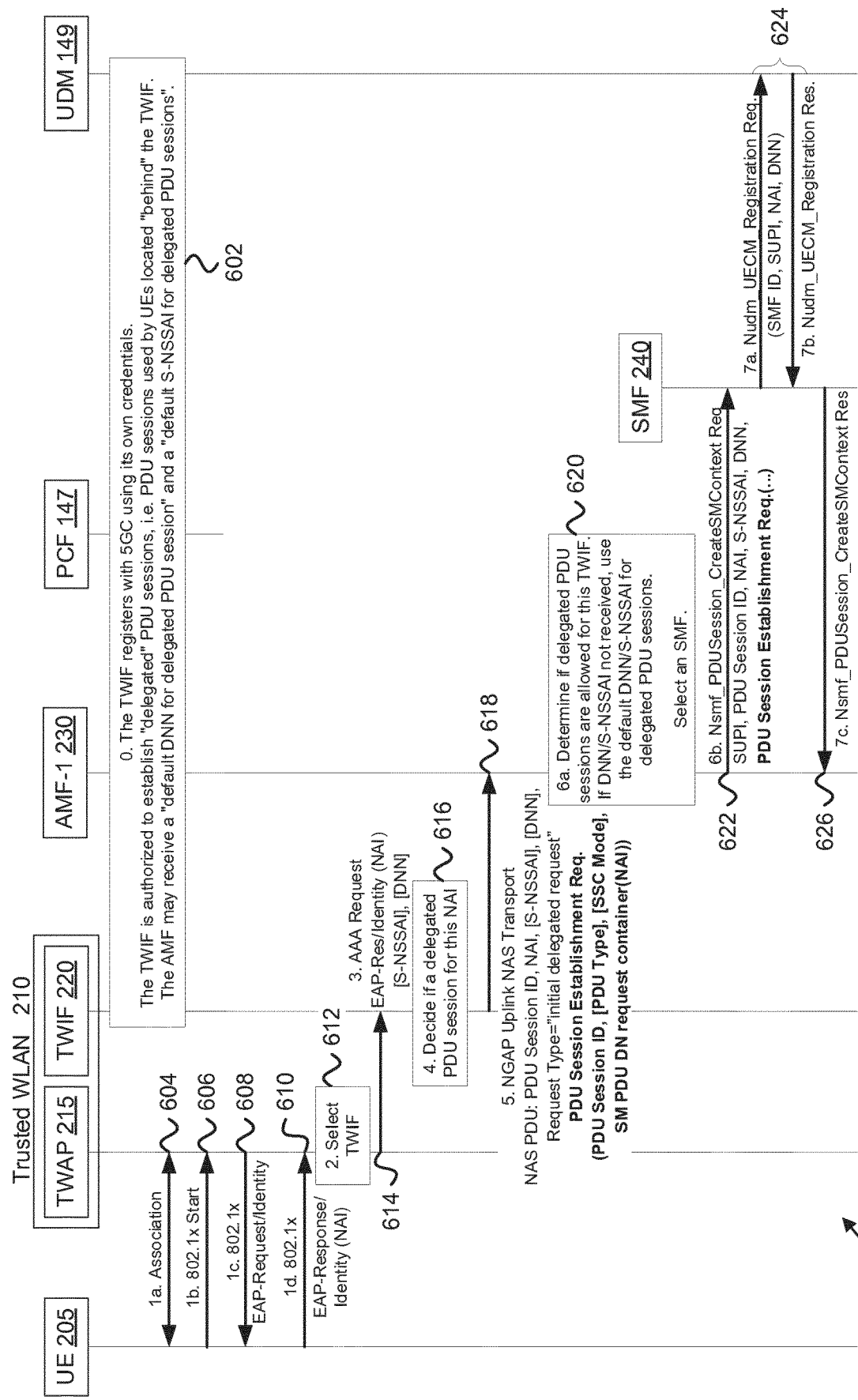
FIG. 6A is a block diagram illustrating one embodiment of a first procedure for supporting delegated data connections.

Referring to FIG. 6A, the first network procedure 600 begins at Step 0 where the TWIF 220 (or other interworking function 135) registers with the 5GC (e.g., an embodiment of the mobile core network 140) using its own credentials (see block 602). Recall that the 5G NAS protocol is used to register with the 5GC. Note that the TWIF 220 must have a 5G subscription, as does any other device that is capable of registering with the 5GC.

The TWIF 220 operates as a radio access function in the trusted WLAN 210, hence, it supports the N2/N3 interfaces for connecting with the 5GC, as shown in FIG. 6A. Moreover, the TWIF 220 also operates as a fixed UE, hence, it supports also the N1 interface and the 5G NAS protocol that is used over this interface.

During the registration with the 5GC, an AMF is allocated as the serving AMF of TWIF 220. Here, the first AMF 230 is allocated. In addition, during the registration with the 5GC, the first AMF 230 may receive from the UDM 149 a "default DNN for delegated PDU Sessions" and a "default S-NSSAI for delegated PDU Sessions", which may be used later when the TWIF 220 requests a delegated PDU Session and no DNN or S-NSSAI is explicitly requested. The values of the "default DNN for delegated PDU Sessions" and the "default S-NSSAI for delegated PDU Sessions" may be included in the subscription for the TWIF 220, which contains special information that enables the TWIF 220 to initiate delegated PDU Sessions and operate as a delegated PDU session controller. Alternatively, the TWIF 220 may not have special information in its subscription but, during registration, it may request to initiate delegated PDU Sessions. If this request is accepted by 5GC, values for "default DNN for delegated PDU Sessions" and a "default S-NSSAI for delegated PDU Sessions" may be provided to its serving AMF (e.g., the first AMF 230), either from the UDM 149 or from the PCF 147.

At Step 1, the UE 205 selects a trusted WLAN that supports delegated PDU Sessions (here the Trusted WLAN 210), associates with this WLAN (see signaling 604) and an EAP authentication procedure is initiated (see signaling 606 and 608). The UE 205 sends an EAP-Response/Identity (see signaling 610) that includes its NAI, which includes a PLMN identity. One example of a NAI is: NAI=username@wlan.mnc015.mcc234.3gppnetwork.org.

In case of an untrusted WLAN 260 (or non-3GPP access, in general), the UE 205 may send an IKE_AUTH request message indicating that the UE 205 wants to establish an IPsec connection with the N3IWF 270. In case of a fixed broadband network 280, the UE 205 may send any signal which indicates that the UE 205 wants to connect with the 5G-RG 285.

Note that the UE 205 may determine which WLAN access networks support "delegated" PDU Sessions to one or more 5G PLMNs with one of the following mechanisms. In a first scenario, the UE 205 may be configured with the identities of the WLANs that support delegated PDU Sessions with one or more PLMNs. In this case, the UE 205 attempts to connect to one of these WLANs, when available. In a second scenario, each WLAN may advertise the list of PLMNs it can interwork with, and, for each PLMN, whether delegated. PDU Sessions are supported. The UE 205 may discover prior to association (e.g. with ANQP) the capabilities of available WLANs, and it may select to connect to a WLAN that supports delegated PDU Sessions with a specific PLMN.

In certain embodiments, whenever a UE 205 successfully connects to a WLAN that it is known to support delegated PDU Sessions with a PLMN and the UE 205 included in its NAI the identity of this PLMN (e.g. NAI=username@wlan.mnc015.mcc234.3gppnetwork.org), the UE 205 assumes that a delegated PDU Session has been established for the UE 205 in this PLMN.

At Step 2, the TWAP 215 selects a TWIF 220 that supports delegated PDU Sessions with the PLMN contained in the NAI of the UE 205 (see block 612).

At Step 3, the TWIF 220 receives a request from the TWAP 215 indicating that a UE (here, the UE 205) requests to connect to the WLAN access network (the trusted WLAN 210). This request includes the NAI of the UE 205, and, optionally, may include a requested DNN and a requested S-NSSAI (see signaling 614).

At Step 4, the TWIF 220 decides whether a delegated PDU Session for this UE 205 should be established (see block 616). This delegated PDU Session would create a tunnel between the TWIF 220 and an external DN 250, which would be used to transfer data packets between the UE 205 and the external DN 250, via the 5G core network (including a UPF 245).

In some embodiments, the TWIF 220 may be configured establish a delegated PDU Session for every UE 205 that attempts to connect to a WLAN. In other embodiments, the TWIF 220 may be configures to establish a delegated PDU Session only for some UEs 205 that connect to the WLAN. For example, the TWIF 220 may decide to establish a delegated PDU Session only if the NAI of the UE 205 includes a special keyword as part of the username (e.g. NAI=delegated!23450999999999@realm) or as part of the realm. This keyword may be pre-defined, or it may be received by TWIF 220 during its 5G registration. Alternatively, the TWIF 220 may decide to establish a delegated PDU Session for the UE 205, if the request in step 3 includes a specific DNN and/or S-NSSAI parameter.

Note that if the TWIF 220 decides not to establish a delegated PDU Session for the UE 205, then the data traffic of the UE 205 may be carried inside a PDU Session, which multiplexes the traffic of all UEs 205 that have no delegated PDU Sessions. In other words, the TWIF 220 may establish a normal PDU Session and use it to transfer the traffic of all UEs 205 for which no delegated PDU Session is established. In this situation, the UEs 205 for which no delegated PDU Session is established are not authenticated/authorized by the 5G core.

Referring now to Step 5: After deciding to establish a delegated PDU Session for the UE 205, the TWIF 220 sends a NAS message to the first AMF 230 including a PDU Session Establishment Request (see signaling 618). In various embodiments, this NAS message contains a Request Type="initial delegated request", indicating that the requested PDU Session is a delegated PDU Session, i.e. a PDU Session that will carry, not the traffic of TWIF 220, but the traffic of a "non-5G-capable over WLAN" UE 205 that is located "behind" the TWIF 220. The PDU Session requested by the TWIF 220 is referred to as a "delegated" PDU Session: It is established by the TWIF 220 (the "delegate" of UE 205) but it is used to carry the traffic of the UE 205. Additionally, the NAS message sent by TWIF 220 also contains the NAI of the UE 205, and this NAI (username@realm) is used to uniquely identify the delegated PDU Session across all delegated PDU Sessions in the 5G PLMN.

In various embodiments, the PDU Session ID in the NAS message sent by TWIF 220 may include any suitable value. In certain embodiments, the PDU Session ID may contain a fixed value (e.g. "255") which is used for all delegated PDU Sessions. Note that, a normal (non-delegated) PDU Session is identified by the permanent identity of the UE 205 that requests the PDU Session (the SUPI) and a unique PDU Session ID ranging from 1-15. However, a delegated PDU Session may be uniquely identified by the NAI of the "Non-5G-capable over WLAN" UE 205. Therefore, the PDU Session ID may not be necessary, assuming that a given UE 205 may have only one delegated PDU Session. Although the PDU Session ID may be unnecessary, the signaling flow may include the PDU Session ID in all messages required by Rel-15 specifications in order to maintain backwards compatibility.

Note that the delegated PDU session is a special type of PDU session. The TWIF 220 may establish normal PDU Sessions for its own use and delegated PDU Sessions for "non-5G-capable over WLAN" UEs 205. The maximum number of delegated PDU Sessions is not limited by the PDU Session ID (since the PDU Session ID is not used as a unique identifier), but may be limited by the TWIF subscription or by policy configured in the 5G core network.

In some embodiments, the PDU Session Establishment Request may include a PDU Type (e.g. IPv4 or IPv6) and an SSC Mode (e.g. SSC Mode 2), if the TWIF 220 is configured with default values for the PDU Type and/or the SSC Mode. These default values however may be overridden by other values provided later by the AAA server 601 (see, e.g., the last message in step 9).

At Step 6a, after the first AMF 230 receives the request from TWIF 220, it confirms that the TWIF is authorized to establish Delegated PDU Sessions (see block 620). This confirmation may be based on subscription information received from UDM 149 during the TWIF 220 registration, or other type of information, such as policy information received from PCF 147.

If the request from the TWIF 220 does not include a DNN and/or an S-NSSAI, the first AMF 230 may use the "default DNN for delegated PDU Sessions" and the "default S-NSSAI for delegated PDU Sessions" that were received during the TWIF registration procedure. Based on these DNN and S-NSSAI values, the first AMF 230 selects an SMF 240.

At Step 6b, the first AMF 230 sends a Create Session Management (SM) Context request to the selected SMF 240 (see signaling 622). This request contains the NAI of the UE 205. This NAI indicates to SMF 240 that this is a request for a delegated PDU Session and the UE 205 is identified by the NAI. In certain embodiments, the SUPI parameter is the permanent identity of the TWIF 220, which requests the delegated PDU Session.

At Step 7, the SMF 240 registers with the UDM 149 by sending a Nudm_UECM_Registration request (see signaling 624). This registration includes the identity of SMF 240 (e.g., the SMF ID) and indicates to the UDM 149 that this SMF 240 holds the SM context of a PDU Session requested by TWIF 220 (identified by the SUPI), for a UE 205 identified by NAI, and for a certain DNN (e.g., of the data network 250). Subsequently, any authorized network function may request from UDM 149 to provide the identity of the SMF 240 that holds the SM context of the delegated PDU Session of the UE 205 (identified by NAI). In various embodiments, the SMF 240 creates the SM context for the delegated PDU Session and sends a response to first AMF 230 (see signaling 626).

Figure 6B:
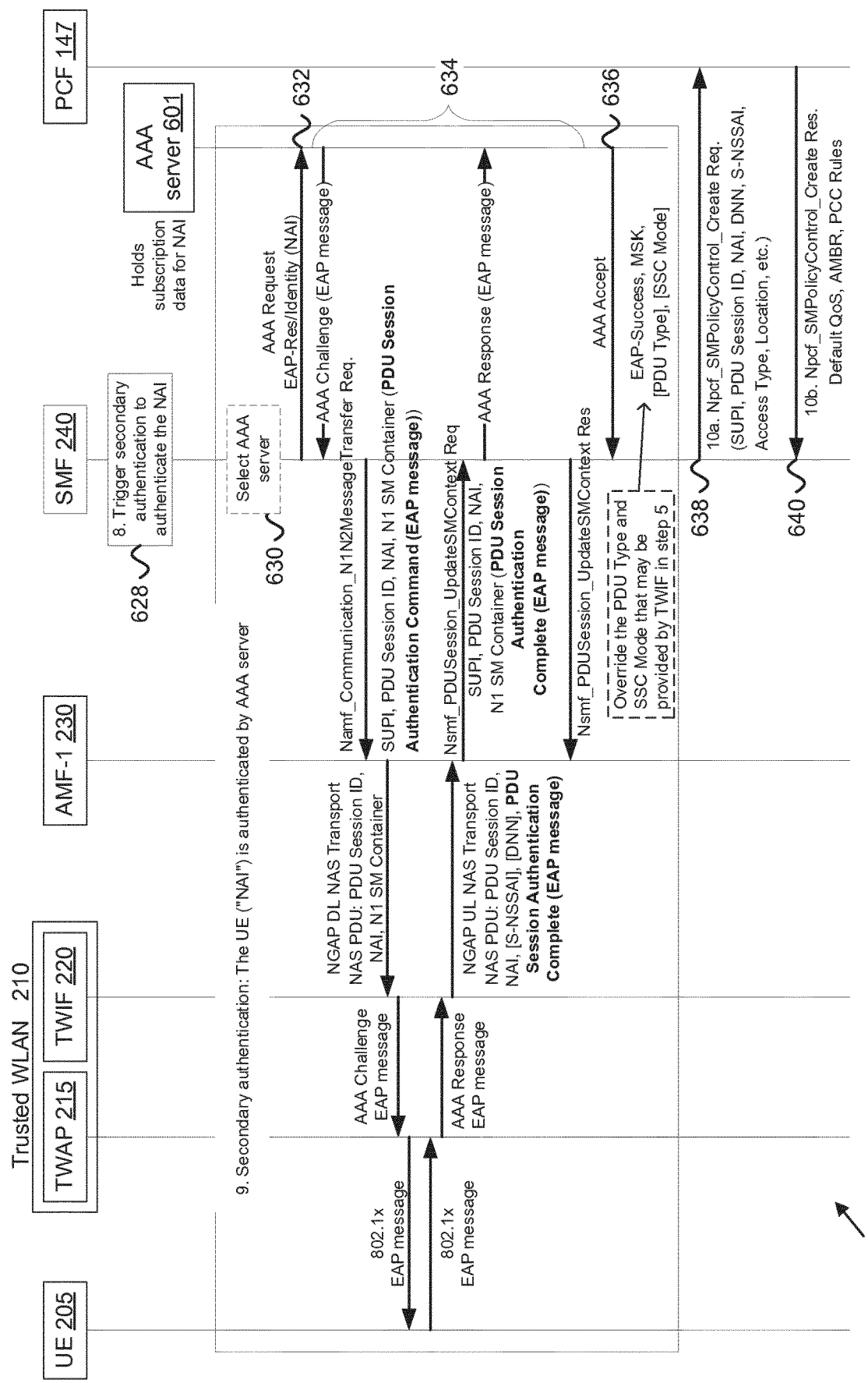
FIG. 6B is a block diagram is a continuation of the procedure of FIG. 6A.

Continuing at FIG. 6B, at Step 8, the SMF 240 starts a "secondary authentication" procedure before the delegated PDU Session is accepted (see block 628). One example of a secondary authentication procedure is described in 3GPP TS 23.502. This authentication is necessary in order to validate the identity of the UE 205 and to decide if this UE 205 is authorized to use a delegated PDU Session with certain DNN and S-NSSAI parameters. It is also necessary in order to derive a Master Session Key (MSK) in the UE 205 and in the AAA server 601, which can be used to secure the communication over the trusted WLAN air interface (see details below).

Step 9 depicts one example of the secondary authentication, where the UE 205 is authenticated by the AAA server 601 using the NAI. The SMF 240 sends a request to the AAA server 601 to authenticate the UE 205 identified by NAI (see signaling 632). In certain embodiments, the SMF 240 may select a certain AAA server 601 which holds the subscription information for the received NAI (see block 630, optional). In one embodiment, this AAA server selection is based on the realm in NAI.

For the purposes of the first network procedure 600, the AAA server 601 is assumed inside the 5GC. For example, the AAA server 601 may be embodied by the AUSF 148. However, in other embodiments, the AAA server 601 may be located inside the data network (DN) 250 associated with the DNN. In the latter case, the SMF 240 would communicate with the AAA server 601 in the DN 250 via a UPF 245, thus UPF selection would be required before sending the request to authenticate the UE 205 identified by NAI.

Next, an EAP-based authentication procedure takes place wherein EAP messages are exchanged between the AAA server and the UE (see signaling 634). An EAP message originated at the AAA server 601 is encapsulated into an AAA message, which is sent to SMF 240. Then, the EAP message is encapsulated into a 5GSM message (PDU Session Authentication Command), which is sent to TWIF 220 via the first AMF 230. Finally, the EAP message is encapsulated into another AAA message, which is sent from TWIF 220 to the WLAN access network (e.g., to the TWAP 215 where the user UE 205 is located, or to a centralized AAA client in the trusted WLAN 210). In the opposite direction (from the UE 205 to the AAA server 601), the same encapsulation mechanisms exist. Accordingly, the TWIF 220 performs interworking between the 5GSM signaling with the SMF 240 and the AAA signaling with the trusted WLAN 210, by converting the 5GSM signaling (a first type of authentication signaling) into AAA signaling (a second type of authentication signaling). This interworking enables EAP messages to be exchanged between the UE 205 and the AAA server 601 via the 5GC and to authenticate the UE 205 (or to mutually authenticate the UE 205 and the AAA server 601) by means of any applicable EAP authentication method. In one example, EAP-AKA messages (see RFC 4187) may be exchanged in order to carry out an EAP-AKA authentication procedure. In another example, EAP-TLS messages (see RFC 5216) may be exchanged in order to carry out an EAP-TLS authentication procedure.

In the final part of a successful authentication procedure, the AAA server 601 sends a AAA Accept message to the SMF 240 (see signaling 636), which may include, not only the MSK derived during the EAP authentication, but also the PDU Type and/or the SSC Mode that should be used for the delegated PDU Session. If necessary, additional parameters may be provided by the AAA server 601, such as the DNN and the S-NSSAI (although they are not shown in the figure). All these parameters can be based on the subscription information of the UE 205, stored in the AAA server 601. Note that the PDU Type and the S-NSSAI provided by the AAA server override the PDU Type and the S-NSSAI respectively that may be provided by the TWIF 220 in step 5 and sent to SMF 240 in step 6b.

Step 10: After receiving the AAA Accept message from the AAA server 601, the SMF 240 requests from PCF 147 to provide the SM policy for the delegated PDU Session (see signaling 638), for example based on the procedures in 3GPP TS 23.502. In contrast to 3GPP TS 23.502, here the SMF 240 sends to the PCF 147 also the NAI of the UE 205 to indicate to the PCF 147 that this is a delegated PDU Session requested by the TWIF 220 (identified by the SUPI) for a specific UE 205 (identified by the NAI). In response, the PCF 147 sends to the SMF 240 the default QoS, the Aggregated Maximum Bit Rate (AMBR) and other parameters, including PCC rules, which should be applied for the delegated PDU Session (see signaling 640).

Figure 6C:
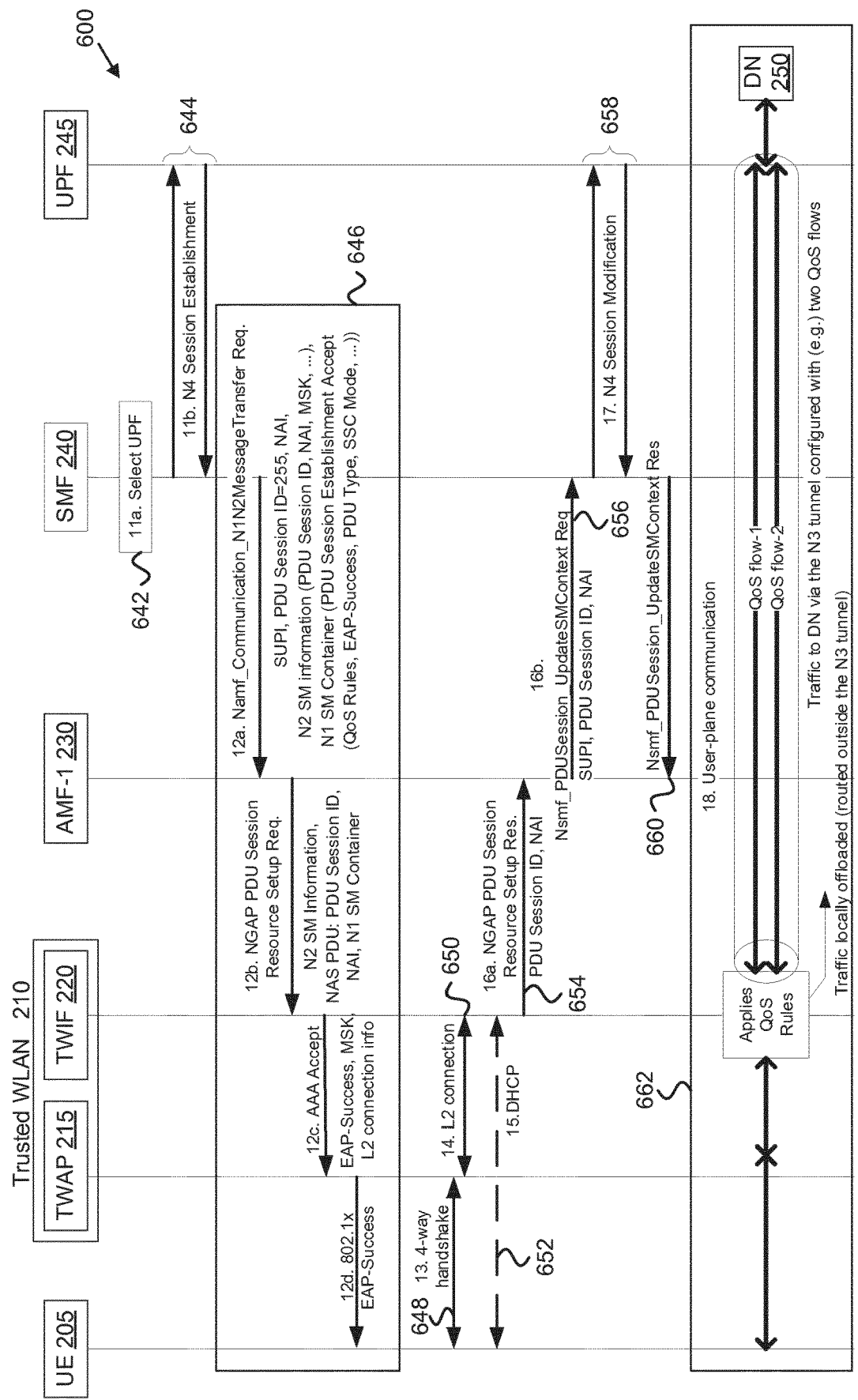
FIG. 6C is a block diagram is a continuation of the procedure of FIG. 6B.

Continuing at FIG. 6C, at Step 11 the SMF 240 selects a UPF 245 (see block 642) and establishes a normal N4 session with the selected UPF 245 (see signaling 644).

Step 12: The SMF 240 sends an N1N2MessageTransfer request to first AMF 230 (see signaling 646), which includes both an N2 SM Information (that should be delivered to the access network—the TWIF 220 in this case) and an N1 SM Container (that should be delivered to the requester of the delegated PDU Session—again the TWIF 220 in this case). The N2 SM Information includes all information required by the access network (e.g., the TWAP 215) to reserve the necessary resources for this PDU Session, including the PDU Session ID, the QoS Profiles, etc. In addition, however, the N2 SM Information includes the NAI associated with the delegated PDU Session and the MSK derived after the successful authentication. The N1 SM Container includes a 5GSM message (PDU Session Establishment Accept), which contains an EAP-Success message, the QoS Rules, the PDU Type, the SSC Mode, etc.

After receiving the N1N2MessageTransfer request with both the N2 SM Information and the N1 SM Container, the first AMF 230 sends a PDU Session Resource Setup request to TWIF 220 (step 12b) in order to reserve the applicable resources for the delegated PDU Session. Note that the TWIF 220 receives both the N2 SM Information and the N1 SM Container because it operates both as a radio access node and as a 5G-capable UE. In the case of the fixed broadband network 280, the 5G-RG 285 would receive the N1 SM Container and the W-5GAN 290 would receive the N2 SM Information.

After receiving the PDU Session Resource Setup request, the TWIF 220 sends a AAA Accept message to the TWAP 215 (step 12c) that includes the EAP-Success message and the MSK, which should be used to protect the data traffic over the WLAN air interface (between the UE 205 and the TWAP 215). In addition, it includes information that can be used by the WLAN access network to setup a Layer 2 (L2) connection with the TWIF 220 and send all data traffic of the UE 205 to TWIF 220 via this connection. After the WLAN access network receives the AAA Accept message, it forwards the EAP-Success message to the UE 205 (step 12d).

Step 13: The MSK (which is also created in the UE 205) is used to derive a Pairwise Master Key (PMK) and to secure the WLAN air-interface traffic between the UE 205 and the TWAP 215 (see signaling 648).

Step 14: A L2 connection is established between the TWAP 215 and the TWIF 220, which is used to carry all data traffic of the UE 205 (see signaling 650).

Step 15: The IP address/prefix assigned for the delegated PDU Session is delivered to the UE 205 (e.g. with DHCP, see signaling 652).

Step 16: The TWIF 220 responds to the first AMF 230 with a PDU Session Resource Setup response (see signaling 654), confirming the reservation of the necessary radio access resources for the delegated PDU Session. In turn, the first AMF 230 updates the SM context in the SMF 2240 for the delegated PDU Session (see signaling 656 and 660).

Step 17: Additionally, the N4 session with the UPF 245 is updated (see signaling 658), in order to provide to UPF 245 the TWIF address and port (tunnel information) which downlink traffic should be forwarded to.

Step 18: The establishment of the delegated PDU Session is now complete. After this point, all data (user-plane) traffic sent by the UE 205 is forwarded by the TWAP 215 to the TWIF 220 via the L2 connection, and from the TWIF 220 it is forwarded to the UPF 245 via the established N3 tunnel (see signaling 662). This N3 tunnel was established during the delegated PDU Session setup and may be configured (based on the received QoS Rules) with one or more QoS flows. The depicted example is shown with two QoS flows, however more or fewer QoS flows are possible. In the uplink direction, the TWIF 220 applies the provisioned QoS Rules and determines to which QoS flow to forward an uplink data packet. In the downlink direction, the UPF 245 applies the provisioned Packet Detection Rules and determines to which QoS flow to forward a downlink data packet.

Note that the TWIF 220 may be also provisioned with rules that indicate which of the UE's data traffic should be locally offloaded and should not go through the established N3 tunnel. As an example, some data traffic may be locally offloaded in order to access services deployed near the TWIF 220 (or even in the TWIF 220) and which cannot be accessed via the DN 250. In certain embodiments, the Offload Rules are provided from the 5GC to the TWIF in 220 only during the establishment of a delegated PDU session, and not during the establishment of a normal (non-delegated) PDU session. The first network procedure 600 ends.

Figure 7A:
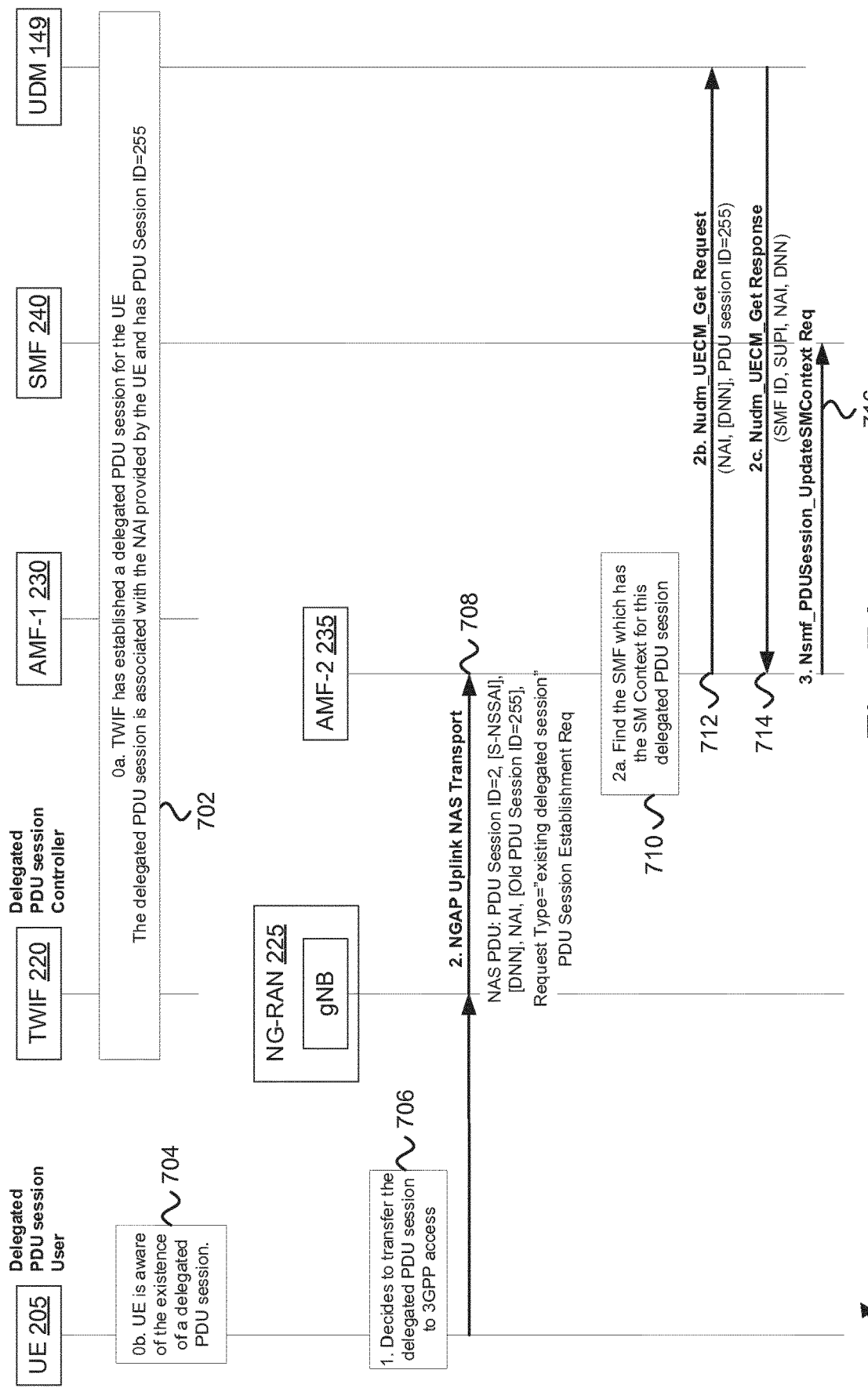
FIG. 7A is a block diagram illustrating one embodiment of a second procedure for supporting delegated data connections.
Figure 7B:
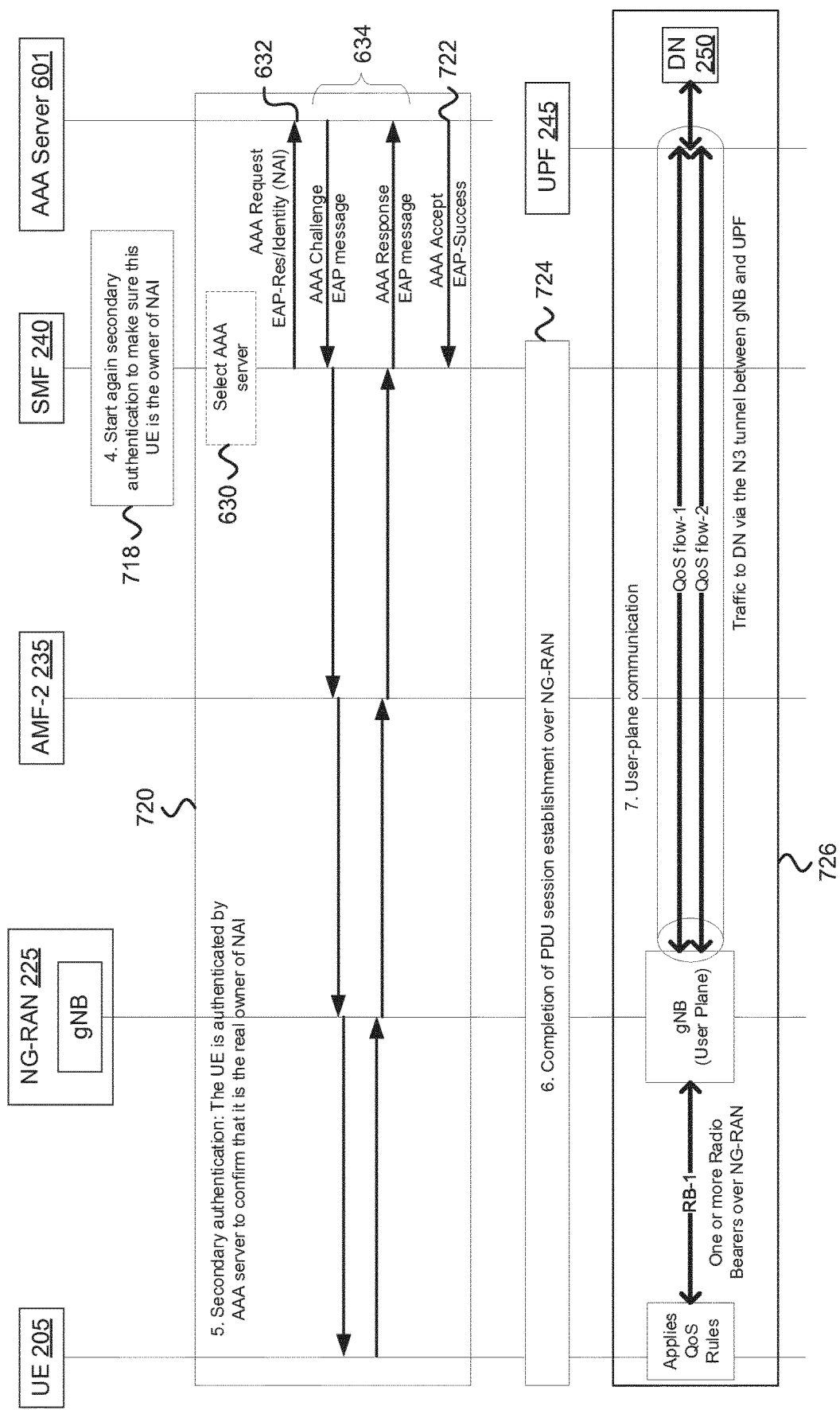
FIG. 7B is a block diagram is a continuation of the procedure of FIG. 7A.

FIGS. 7A and 7B depict a second network procedure 700. The second network procedure 700 involves the UE 205, the TWIF 220, the NG-RAN 225, the first AMF ("AMF-1") 230, the second AMF ("AMF-2") 235, the UDM 149, the SMF 240, the UPF 245, the DN 250, and an AAA server 601. The second network procedure 700 may be used to transfer a delegated PDU session. Note that while the TWIF 220 is shown, the first network procedure 600 also applies to situations where the UE 205 connects to another type of non-3GPP access network 130 having an interworking function 135. In other words, the TWIF 220 is representative of the interworking function 135 in the second network procedure 700.

The second network procedure 700 may be used when the UE 205 supports the 5G NAS protocol over 3GPP access (NG-RAN 225), i.e. when the UE 205 is 5G-capable over 3GPP access. In this case, the UE 205 may attempt to transfer to 3GPP access (e.g., the NG-RAN 225) the delegated PDU session that was established by the TWIF 220 when this UE 205 connected to a non-3GPP access (e.g., the trusted WLAN 210). This transfer may be initiated by the UE 205, for example when the UE 205 is disconnected from the non-3GPP access, or when the signal strength over non-3GPP access deteriorates (e.g. the UE 205 is moving out of the WLAN coverage). The advantage of transferring the delegated PDU session to 3GPP access (versus establishing a new PDU session over 3GPP access) is that the IP address assigned to the PDU session may remain unchanged and, thus, ongoing IP communication over the PDU session will be continued after the transfer (e.g., IP session continuity can be provided).

Note that after a delegated PDU session is transferred to the 3GPP access, it becomes a normal PDU session (it is no longer a delegated PDU session). This is because the same UE 205 is both the controller and the user of the new (e.g., normal) PDU session. There is no need for a TWIF 220 because the UE 205 can itself exchange 5G NAS messages with the 5G core network over 3GPP access (NG-RAN 225).

Referring to FIG. 7A, the second network procedure 700 begins at Step 0 where the UE 205 connects to a trusted WLAN 210 and the TWIF 220 establishes a delegated PDU session for this UE 205 (see block 702). All UE's data traffic is routed to the TWIF 220, which forwards it to the Data Network 250, via the established N3 tunnel. In certain embodiments, some data traffic may be locally offloaded. Here, Step 0 encompasses the first network procedure 600, described above with reference to FIGS. 6A-6C. Note that the UE 205 receives a first IP address when connecting the trusted WLAN 210 and establishing the delegated PDU session. As discussed above, after the transfer of the connection to 3GPP access, the UE will be using the same IP address.

Here, it is assumed that the UE 205 is aware that a delegated PDU session was established for itself when the UE 205 was connected to the trusted WLAN 210 (see block 704). For example, the UE 205 may determine that a delegated PDU session was established based on some capabilities advertised by the WLAN. For example, the trusted WLAN 210 may advertise several capabilities including the PLMNs it can interwork with. Thus, the trusted WLAN 210 may advertise that it can interwork with PLMN-a, and that it can support delegated PDU sessions with this PLMN-a. If the UE 205 discovers this WLAN capability, then it can infer that a delegated PDU session was established for itself after successful authentication and connection to the WLAN.

Alternatively, the UE 205 may be configured with a list of access network identifiers (e.g., SSIDs) known to support delegated PDU sessions with a PLMN. From this, the UE 205 may infer that a delegated PDU session was established for itself after successful authentication and connection to an access network identified in the list. In a third alternative, when a delegated PDU session is established for the UE 205 and the UE 205 is registered over 3GPP access, the UE could receive an indication over 3GPP access.

Step 1: The UE 205 decides to transfer to 3GPP access the delegated PDU session established for itself via non-3GPP access (see block 706). Recall that this delegated PDU session is associated with the NAI provided by the UE 205 during authentication over non-3GPP access (e.g., trusted WLAN 210). As an example, the UE 205 may take this decision immediately after being disconnected from the non-3GPP access, or when the received non-3GPP access signal deteriorates considerably.

Step 2: To request the delegated PDU session transfer to 3GPP access, the UE 205 sends over 3GPP access (the NG-RAN 225) a NAS message that contains a PDU Session Establishment Request, Request Type="existing delegated session" and the NAI used to connect via non-3GPP access (see signaling 708). The NAS message contains also a normal PDU Session ID (from 1 to 15) because the delegated PDU session is to be converted to a normal PDU session over the NG-RAN 225. The PDU Session ID used for the delegated PDU session ("255") may also be included, although it may not be necessary (it may be needed in roaming scenarios where the first AMF 230 and the second AMF 235 belong to different PLMNs that use different reserved values for delegated PDU sessions, e.g. "255" and "250"). In certain embodiments, the NAS message may leave out a DNN and/or an S-NSSAI, because the UE 205 may not know the DNN and the S-NSSAI the TWIF 220 (or first AMF 230) used when establishing the delegated PDU session.

In various embodiments, the NAS message indicates to the second AMF 235 (which is the serving AMF of UE over 3GPP access) that the UE 205 attempts to transfer to 3GPP access an existing delegated PDU session associated with NAI. Here, the request for a normal (not delegated) PDU session over NG-RAN 225 which is also associated with a NAI, triggers the mobile network to "substitute" the existing delegated PDU session associated with this NAI with the new PDU session over the NG-RAN 225. "Substitute" means that the new PDU session inherit all the parameters of the existing (delegated) PDU session, including the DNN, S-NSSAI, the allocated IP address, etc.

To transfer the existing delegated PDU session, the second AMF 235 needs to discover the SMF that maintains the SM context for this delegated PDU session (see block 710). For this purpose, the second AMF 235 sends to the UDM 149 a Nudm_UECM_Get Request containing the NAI (see signaling 712). The UDM 149 searches through all delegated PDU sessions registered by an SMF 240 (refer to signaling step 624 of FIG. 6A) and discovers the SMF 240 that has registered a delegated PDU session associated with the received NAI. The UDM 149 then sends a response to second AMF 235 containing the SMF ID (see signaling 714).

Step 3: Subsequently, the second AMF 235 sends a PDU Session Update request to the SMF 240 to update the SM context of the delegated PDU session (see signaling 716). This request indicates that the delegated PDU session should become a normal PDU session, its Access Type should change to 3GPP access, and that the second AMF 235 is the serving node of the UE 205 associated with the normal PDU session.

Continuing at FIG. 7B, at Step 4 the SMF 240 starts another "secondary authentication" procedure to confirm that the UE 205 requesting the transfer possesses the credentials associated with the received NAI (i.e. the UE 205 is the real user of the delegated PDU session) before the SMF 240 accepts the PDU Session Update request from second AMF 235 (see block 718). If this authentication is not executed, then any UE 205 would be able to transfer a delegated PDU session established for another UE 205 (e.g., established using another's NAI).

Step 5: The "secondary authentication" procedure takes place and EAP messages are exchanged between the UE 205 and the AAA server 601, via the SMF 240 and second AMF 235 (see block 720). This secondary authentication procedure is substantially as described above with reference to signaling steps 630-634 of FIG. 6B. In certain embodiments, the SMF 240 may select the AAA server 601, as discussed above.

After the successful authentication, the AAA server 601 creates an AAA Accept message including the EAP-Success (see signaling 722). In this case, however, there is no need for the AAA server 601 to provide an MSK, neither a PDU Type nor an SSC Mode. Thus, in one embodiment the AAA server 601 needs to be informed by SMF 240 whether the authentication is for a normal PDU session (as in the second network procedure 700) or for a delegated PDU session (as in the first network procedure 600) in order to generate the proper message and parameters. Alternatively, in another embodiment the AAA server 601 may always send the MSK, the PDU Type and the SSC Mode to the SMF 240, however the SMF 240 may use them only when a delegated PDU session is established. Here, the SMF 240 would discard the MSK, the PDU Type and the SSC Mode, if they are sent by the AAA server 601.

Step 6: After the successful authentication of the UE 205, the PDU session establishment procedure over 3GPP access (NG-RAN 225) is completed as normally (see block 724). In addition, the TWIF 220 is informed by the SMF 240 to release the delegated PDU session for this UE 205 (e.g., as identified by the NAI) and the associated WLAN resources.

Step 7: At this point, transfer is complete and user-plane communication takes place over the NG-RAN 225 (see signaling 726). Note that because the new PDU session inherits all the parameters of the delegated PDU session, the IP address remains the same and the UE 205 does not experience service interruption due to a change in IP address. The UE 205 may be configured (based on the received QoS Rules) with one or more QoS flows. The depicted example is shown with two QoS flows, however more or fewer QoS flows are possible. In the uplink direction, the UE 205 applies the provisioned QoS Rules and determines to which QoS flow to forward an uplink data packet. In the downlink direction, the UPF 245 applies the provisioned Packet Detection Rules and determines to which QoS flow to forward a downlink data packet. Note that the QoS flows may be multiplexed on the same radio bearer over NG-RAN 225. The second network procedure 700 ends.

Figure 8:
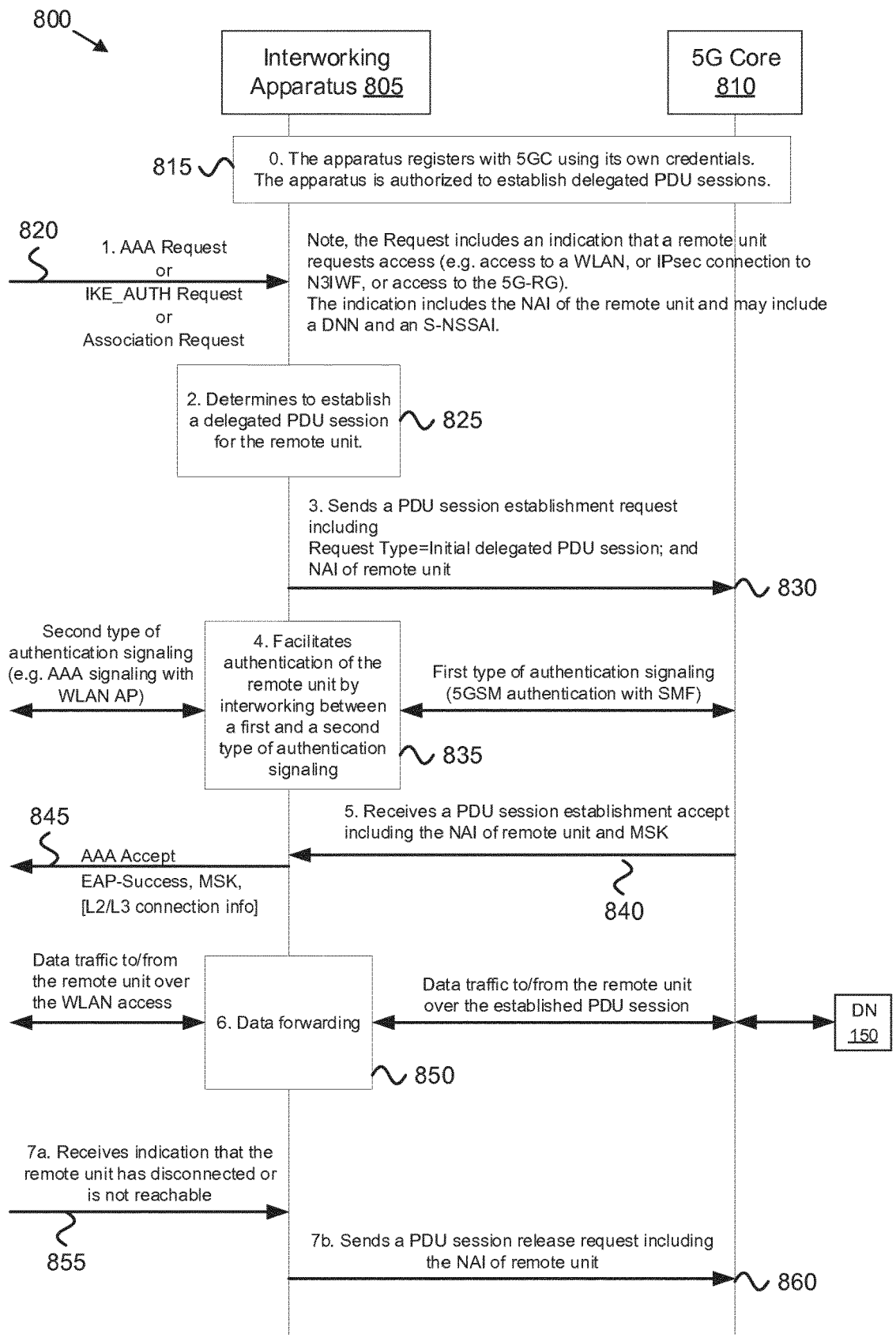
FIG. 8 is a block diagram illustrating one embodiment of a third procedure for supporting delegated data connections.

FIG. 8 depicts a third network procedure 800 for establishing a delegated PDU session. The third network procedure 800 involves an interworking apparatus 805 and a 5G core network ("5GC") 810. The third network procedure 800 may be a simplified embodiment of the first network procedure 600, showing the actions of the interworking apparatus 805, which may be an embodiment of the TWIF 220, the N3IWF 270, the 5G-RG 285, and/or the interworking apparatus 400.

The third network procedure 800 begins with the interworking apparatus 805 registering with the 5GC 810 (see block 815). Here, the interworking apparatus 805 registers as a (fixed) UE with the 5GC 810 using its own credentials. In various embodiments, the interworking apparatus 805 indicates to the 5GC 810 (e.g., during registration) that it supports delegated PDU sessions. The 5GC 810 authenticates the interworking apparatus 805 and determines that the interworking apparatus 805 is authorized to establish delegated PDU sessions.

At some later time, the interworking apparatus 805 receives a request from the WLAN access network indicating that a remote unit (e.g., a UE) requests to connect to the WLAN access network (see signaling 820). Here, the remote unit is non-5G-capable over WLAN access. Moreover, the request includes the NAI of the remote unit, and, optionally, may include a requested DNN and a requested. S-NSSAI. In one embodiment, this request may be an AAA Request. In case of an untrusted WLAN (or non-3GPP access, in general), the request may be an IKE_AUTH request message indicating that the remote unit wants to establish an IPsec connection with the N3IWF. In case of a fixed broadband network, the request could be any signal which indicates that a remote unit wants to connect with the 5G-RG.

The interworking apparatus 805 determines whether to establish a delegated PDU session for the remote unit (see block 825). In one embodiment, the interworking apparatus 805 may determine to establish a delegated PDU session only for remote units using a specific NAI, for example having a keyword or specific value in the username or realm. One example of such an NAI is "delegated!234150999999999@wlan.mnc071.mcc610.3gppnetwork.org," where "delegated" is the keyword in the username. In another embodiment, the interworking apparatus 805 may determine to establish a delegated PDU session only when the access request includes a specific DNN and/or S-NSSAI. In a third embodiment, the interworking apparatus 805 may establish a delegated PDU session only when the access request indicates that the remote unit wants to connect to a certain SSID.

Upon determining to establish a delegated PDU session, the interworking apparatus 805 sends (to the 5GC 810) a PDU Session Establishment Request message including a special request type indicating an initial delegated PDU session and the NAI of the remote unit (see signaling 830).

Additionally, the interworking apparatus 805 enables authentication of the remote unit by interworking between a first and a second type of authentication signaling (see block 835 and associated signals). In the depicted embodiment, the first type of authentication signaling is 5GSM authentication with an SMF in the 5GC 810, while the second type of authentication signaling is AAA signaling used by the WLAN AP.

Upon successful authentication of the remote unit, the interworking apparatus 805 receives a PDU Session Establishment Accept message (see signaling 840). Here, the PDU Session Establishment Accept message includes the NAI of the remote unit and a MSK to be used between the remote unit and the WLAN AP (e.g., for deriving WLAN security keys and protecting the air interface).

The interworking apparatus 805 sends an AAA accept message (e.g., encapsulating an EAP-Success message) towards the WLAN access network that includes the EAP-Success message (for the user UE) and the MSK (see signaling 845). In addition, the AAA accept message may include information that can be used by the WLAN access network to setup a Layer 2 or Layer 3 (L2/L3) connection with the interworking apparatus 805 and send all data traffic of the remote unit to the interworking apparatus 805 via this specific connection.

At this point, the delegated PDU session is established and the interworking apparatus 805 forwards (user plane) data traffic of the remote unit (see block 850 and associated messages). Later, the interworking apparatus 805 may receive an indication that the remote unit has disconnected from the WLAN or is no longer reachable via the WLAN (see signaling 855). In response, the interworking apparatus 805 may send a PDU session release request to the 5GC 810, the PDU session release request including the NAI of the remote unit (see signaling 860). The third network procedure 800 ends.

Figure 9:
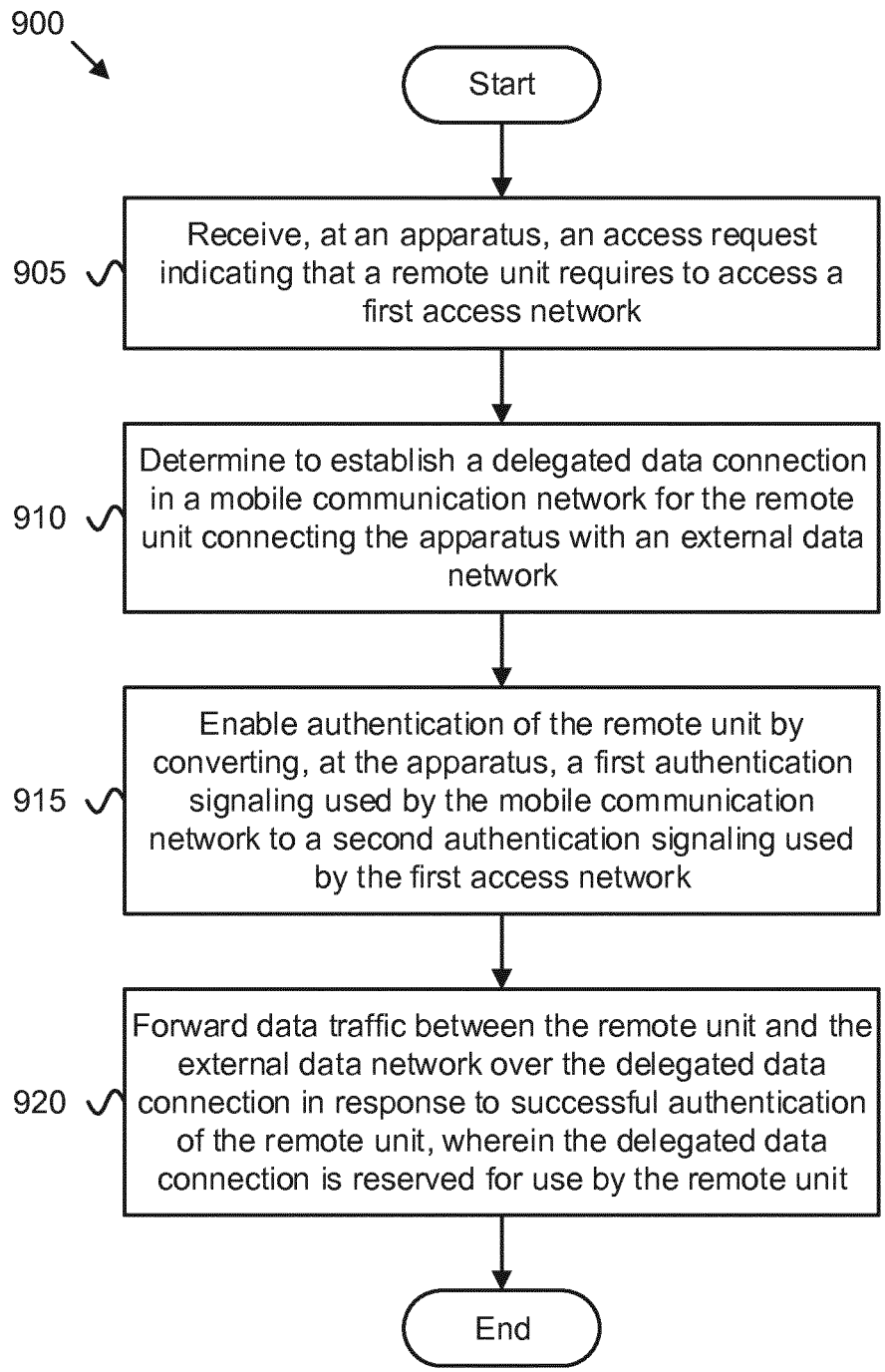
FIG. 9 is a flow chart diagram illustrating one embodiment of a method for supporting delegated data connections.

FIG. 9 depicts a method 900 for establishing a delegated PDU session, according to embodiments of the disclosure. In some embodiments, the method 900 is performed by an apparatus, such as the interworking function 135, the TWIF 220, the N3IWF 270, the 5G-RG 285, and/or the interworking apparatus 400. In certain embodiments, the method 900 may be performed by a processor executing program code, for example, a microcontroller, a microprocessor, a CPU, a GPU, an auxiliary processing unit, a FPGA, or the like.

The method 900 begins includes receiving 905, at an apparatus, an access request indicating that a remote unit requires to access a first access network. In various embodiments, the first access network is a WLAN.

The method 900 includes determining 910 to establish a delegated data connection in a mobile communication network for the remote unit connecting the apparatus with an external data network. In various embodiments, the access request includes a DNN of the external data network. In one embodiment, determining 910 to establish a delegated data connection is based on the DNN.

In certain embodiments, determining 910 to establish a delegated data connection is based on a NAI included in the access request. In certain embodiments, determining 910 to establish a delegated data connection is based on a network identifier indicated in the access request, such as a SSID. In certain embodiments, determining 910 to establish a delegated data connection is based on an S-NSSAI included in the access request.

The method 900 includes enabling 915 authentication of the remote unit by converting, at the apparatus, a first authentication signaling used by the mobile communication network to a second authentication signaling used by the first access network.

The method 900 includes forwarding 920 data traffic between the remote unit and the external data network over the delegated data connection in response to successful authentication of the remote unit, wherein the delegated data connection is reserved for use by the remote unit. In some embodiments, forwarding 920 data traffic between the remote unit and the external data network over the delegated data connection includes sending certain data over the delegated data connection based on one or more traffic steering rules and offloading other data to a local connection. The method 900 ends.

Figure 10:
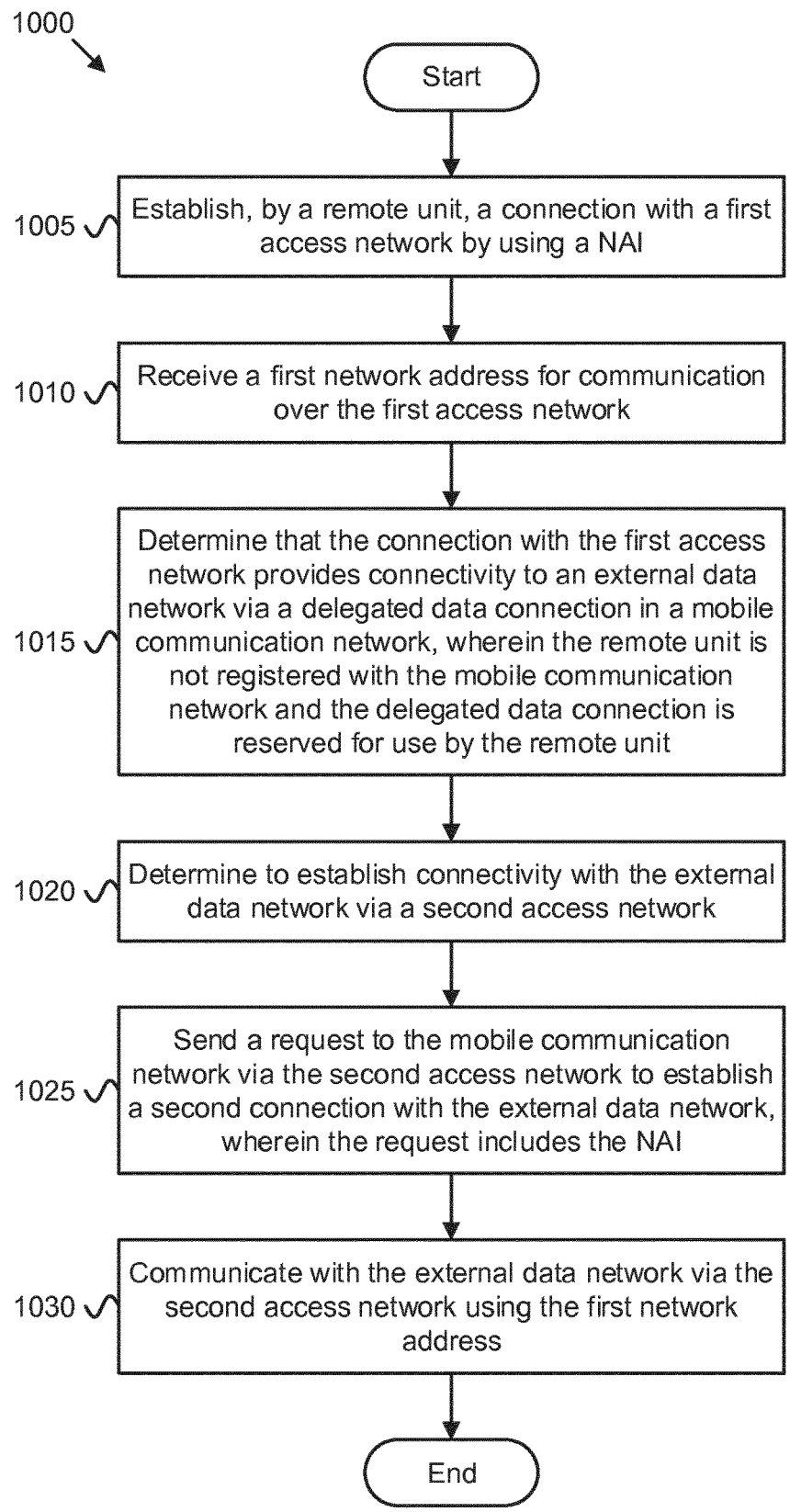
FIG. 10 is a flow chart diagram illustrating one embodiment of a second method for supporting delegated data connections.

FIG. 10 depicts a method 1000 for transferring a delegated PDU session, according to embodiments of the disclosure. In some embodiments, the method 1000 is performed by an apparatus, such as the remote unit 105, the UE 205, and/or the user equipment apparatus 300. In certain embodiments, the method 1000 may be performed by a processor executing program code, for example, a microcontroller, a microprocessor, a CPU, a GPU, an auxiliary processing unit, a FPGA, or the like.

The method 1000 begins includes establishing 1005, by the apparatus, a connection with a first access network by using a NAI. In some embodiments, establishing 1005 the connection with the first access network by using the NAI includes authenticating the apparatus with a mobile communication network via the first access network.

The method 1000 includes receiving 1010 a first network address for communication over the first access network. In one embodiment, the first network address is a first IP address. In certain embodiments, receiving 1010 the first network address occurs after authenticating the apparatus with using the NAI and associated credentials.

The method 1000 includes determining 1015 that the connection with the first access network provides connectivity to an external data network via a delegated data connection in a mobile communication network. Here, the apparatus is not registered with the mobile communication network and the delegated data connection is reserved for use by the apparatus. In one embodiment, determining 1015 that the connection with the first access network provides connectivity to the external data network via the delegated data connection is based on an identity of the first access network. In another embodiment, determining 1015 that the connection with the first access network provides connectivity to the external data network via the delegated data connection is based on discovered interworking capabilities of the first access network.

The method 1000 includes determining 1020 to establish connectivity with the external data network via a second access network and sending 1025 a request to the mobile communication network via the second access network to establish a second connection with the external data network, wherein the request includes the NAI. In various embodiments, the second access network is a NG-RAN and sending 1025 the request for the second connection includes requesting a normal (e.g., not delegated) PDU session. In certain embodiments, the request to establish the second data connection includes an indication to transfer an existing delegated PDU Session. In some embodiments, the request for the second connection is populated with the parameters of the delegated data connection (e.g., a delegated PDU session), including the DNN, S-NSSAI, the allocated IP address, and the like.

The method 1000 includes communicating 1030 with the external data network via the second access network using the first network address. Beneficially, by transferring the first network address from the delegated data connection to the new data connection, existing data sessions using the first network address are not interrupted. The method 1000 ends.

Disclosed herein is a first method for supporting delegated data connections. In various embodiments, the first method may be implemented by an interworking apparatus, such as a TWIF, N3IWF, or a 5G-RG. The first method includes receiving, at an apparatus, an access request indicating that a remote unit requires to access a first access network and determining to establish a delegated data connection in a mobile communication network for the remote unit connecting the apparatus with an external data network. Here, the external data network may be identified by a DNN included in the access request. In various embodiments, the first access network is a non-3GPP network, such as a WLAN. In one embodiment, the access request is an AAA Request. In another embodiment, the access request is an IKE_AUTH request. The first method includes enabling authentication of the remote unit by converting, at the apparatus, a first authentication signaling used by the mobile communication network to a second authentication signaling used by the first access network and forwarding data traffic between the remote unit and the external data network over the delegated data connection in response to successful authentication of the remote unit. Here, the delegated data connection is reserved for use by the remote unit.

In some embodiments, the first method further includes registering the apparatus with the mobile communication network using a first set of credentials, said registration occurring prior to receiving the access request, wherein the remote unit is not registered with the mobile communication network. In certain embodiments, registering the apparatus with the mobile communication network including sending an indication that the apparatus supports delegated data connections in the mobile communication network. In certain embodiments, the registration uses a "special" registration to indicate that the apparatus wants to establish delegated data connections in the mobile communication network. Here, each delegated data connection is reserved to carry the data traffic of a remote unit.

In various embodiments, the access request received by the apparatus includes a NAI. In such embodiments, the determination to establish the delegated data connection is based on the NAI. For example, the determination may be based on the presence of keyword in the username of the NAI. As another example, the determination may be based on the presence of a special realm in the NAI.

In some embodiments, the access request received by the apparatus indicates a SSID. In such embodiments, the determination to establish the delegated data connection may be based on the SSID. In some embodiments, the access request received by the apparatus indicates at least one of a DNN and a S-NSSAI. In such embodiments, the determination to establish the delegated data connection may be based on the at least one of a DNN and S-NSSAI.

In some embodiments, the first method includes transmitting a PDU Session Establishment request to the mobile communication network in response to determining to establish the delegated data connection for the remote unit. In such embodiments, the PDU Session Establishment request indicates that the requested PDU Session is for an initial delegated PDU Session. In one embodiment, the PDU Session Establishment request includes a NAI of the remote unit.

In certain embodiments, the first method includes receiving a PDU Session Resource Setup Request message for the delegated PDU Session, the PDU Session Resource Setup Request message including a PDU Session Establishment Accept message, the NAI of the remote unit and a MSK. Here, the MSK is used to protect the data traffic between the remote unit and the first access network. In certain embodiments, the PDU Session Establishment request includes a session identifier having a special value to indicate that the requested PDU Session is a delegated PDU Session used to carry the data of the remote unit.

In certain embodiments, the first method includes receiving one or more traffic steering rules for data traffic of the remote unit. In such embodiments, forwarding data traffic between the remote unit and the external data network over the delegated data connection includes sending certain data over the delegated data connection based on the one or more traffic steering rules and offloading other data to a local connection.

In certain embodiments, the first method includes receiving an indication that the remote unit is disconnected from the first access network or is not reachable in the first access network and sending a PDU Session release request to the mobile communication network, the PDU Session release request including a NAI of the remote unit. In certain embodiments, the first method includes receiving an indication that a PDU Session associated with the NAI of the remote unit has been established via a second access network and releasing the delegated data connection associated with the NAI and corresponding resources in the first access network.

In certain embodiments, the apparatus operates as a fixed UE in the mobile communication network and performs session management control signaling on behalf of the remote unit. In some embodiments, the remote unit is incapable of authenticating with the mobile communication network over the first access network (e.g., non-5G-capable over WLAN) using the first type of authentication signaling (e.g., 5G NAS signaling).

In some embodiments, the first method includes receiving an indication that the remote unit is transferring from the first access network to a second access network. Here, the indication includes a NAI of the remote unit. In such embodiments, the first method also includes releasing the delegated data connection associated with the NAI and corresponding resources in the first access network.

Disclosed herein is a first apparatus for supporting delegated data connections. In various embodiments, the first method may be an interworking function, such as a TWIF, N3IWF, or a 5G-RG. The first apparatus includes a processor and a transceiver that receives an access request indicating that a remote unit requires to access a first access network. The processor determines to establish a delegated data connection in a mobile communication network for the remote unit connecting the apparatus with an external data network. Here, the external data network may be identified by a DNN included in the access request. In various embodiments, the first access network is a non-3GPP network, such as a WLAN. In one embodiment, the access request is an AAA Request. In another embodiment, the access request is an IKE_AUTH request.

The processor enables authentication of the remote unit by converting, at the apparatus, a first type of authentication signaling used by the mobile communication network to a second type of authentication signaling used by the first access network. The processor forwards data traffic between the remote unit and the external data network over the delegated data connection in response to successful authentication of the remote unit. Here, the delegated data connection is reserved for use by the remote unit.

In some embodiments, the processor registers the apparatus with the mobile communication network using a first set of credentials, said registration occurring prior to receiving the access request, wherein the remote unit is not registered with the mobile communication network. In certain embodiments, registering the apparatus with the mobile communication network including sending an indication that the apparatus supports delegated data connections in the mobile communication network. In certain embodiments, the registration uses a "special" registration to indicate that the apparatus wants to establish delegated data connections in the mobile communication network. Here, each delegated data connection is reserved to carry the data traffic of a remote unit.

In various embodiments, the access request received by the apparatus includes a NAI. In such embodiments, the determination to establish the delegated data connection is based on the NAI. For example, the determination may be based on the presence of keyword in the username of the NAI. As another example, the determination may be based on the presence of a special realm in the NAI.

In some embodiments, the access request received by the apparatus indicates a SSID. In such embodiments, the determination to establish the delegated data connection may be based on the SSID. In some embodiments, the access request received by the apparatus indicates at least one of a DNN and a S-NSSAI. In such embodiments, the determination to establish the delegated data connection may be based on the at least one of a DNN and S-NSSAI.

In some embodiments, the processor controls the transceiver to send a PDU Session Establishment request to the mobile communication network in response to determining to establish the delegated data connection for the remote unit. In such embodiments, the PDU Session Establishment request indicates that the requested PDU Session is for an initial delegated PDU Session. In one embodiment, the PDU Session Establishment request includes a NAI of the remote unit.

In certain embodiments, the processor receives a PDU Session Resource Setup Request message for the delegated PDU Session, the PDU Session Resource Setup Request message including a PDU Session Establishment Accept message, the NAI of the remote unit and a MSK. Here, the MSK is used to protect the data traffic between the remote unit and the first access network. In certain embodiments, the PDU Session Establishment request includes a session identifier having a special value to indicate that the requested PDU Session is a delegated PDU Session used to carry the data of the remote unit.

In certain embodiments, the processor receives one or more traffic steering rules for data traffic of the remote unit. In such embodiments, forwarding data traffic between the remote unit and the external data network over the delegated data connection includes sending certain data over the delegated data connection based on the one or more traffic steering rules and offloading other data to a local connection.

In certain embodiments, the processor receives an indication that the remote unit is disconnected from the first access network or is not reachable in the first access network and sending a PDU Session release request to the mobile communication network, the PDU Session release request including a NAI of the remote unit. In certain embodiments, the processor receives an indication that a PDU Session associated with the NAI of the remote unit has been established via a second access network and releases the delegated data connection associated with the NAI and corresponding resources in the first access network.

In certain embodiments, the apparatus operates as a fixed UE in the mobile communication network and performs session management control signaling on behalf of the remote unit. In some embodiments, the remote unit is incapable of authenticating with the mobile communication network over the first access network (e.g., non-5G-capable over WLAN) using the first type of authentication signaling (e.g., 5G NAS signaling).

In some embodiments, the processor receives an indication that the remote unit is transferring from the first access network to a second access network. Here, the indication includes a NAI of the remote unit. In such embodiments, the processor releases the delegated data connection associated with the NAI and corresponding resources in the first access network.

Disclosed herein is a second method for supporting delegated data connections. In various embodiments, the second method may be implemented by a remote unit, such as a UE. The second method includes establishing, by the remote unit, a connection with a first access network by using a NAI and receiving a first network address for communication over the first access network. For example, the UE may connect with a WLAN and receive a first IP address. Moreover, establishing the connection may include the remote unit performing an authentication using its NAI and associated credentials.

Moreover, the second method includes determining that the connection with the first access network provides connectivity to an external data network via a delegated data connection in a mobile communication network. Here, the remote unit is not registered with the mobile communication network and the delegated data connection is reserved for use by the remote unit. The second method includes determining to establish connectivity with the external data network via a second access network and sending a request to the mobile communication network via the second access network to establish a second connection with the external data network, wherein the request includes the NAI. In various embodiments, the second method includes communicating with the external data network via the second access network using the first network address.

In certain embodiments, the request to establish the second connection is a request for a normal (not delegated) PDU session over NG-RAN. Moreover, the included NAI triggers the mobile communication network to "substitute" the existing delegated PDU session associated with this NAI with the new PDU session over NG-RAN. "Substitute" means that the new PDU session inherit all the parameters of the existing (delegated) PDU session, including the DNN, S-NSSAI, the allocated IP address, etc.

In some embodiments, the second method further includes authenticating the remote unit with the mobile communication network using credentials associated with the NAI prior to communicating with the external data network via the second access network using the first network address, wherein the remote unit uses a first type of authentication signaling to authenticate via the second access network. Moreover, establishing the connection with a first access network by using the NAI may include the remote unit authenticating with the mobile communication network via the first access network, wherein the remote unit uses a second type of authentication signaling to authenticate via the first access network, the second type different than the first type.

In certain embodiments, the request sent to the mobile communication via the second access network to establish the second data connection includes a PDU Session Establishment request and comprises an indication that the second data connection is to replace an existing delegated PDU Session. Here, the delegated data connection is a delegated PDU session and the second data connection is a normal PDU session (e.g., not a delegated PDU session). In some embodiments, the remote unit is configured with a list of one or more access network identities that support delegated data connections to the mobile communication network. In such embodiments, determining that the connection with a first access network provides connectivity to an external data network via a delegated data connection in a mobile communication network is based on an identity of the first access network.

In some embodiments, the second method includes discovering an interworking capability of the first access network. In such embodiments, determining that the connection with a first access network provides connectivity to an external data network via a delegated data connection in a mobile communication network is based on the discovered interworking capability. In one embodiment, the interworking capability includes a list of one or more mobile communication networks with which the first access network can establish delegated data connections.

Disclosed herein is a second apparatus for supporting delegated data connections. In various embodiments, the second apparatus may be a remote unit, such as a UE. The second apparatus includes a processor and a transceiver for establishing a connection with a first access network by using a NAI and receiving a first network address for communication over the first access network. For example, the UE may connect with a WLAN and receive a first IP address. Moreover, establishing the connection may include the processor performing an authentication using the NAI and associated credentials.

Moreover, the processor determines that the connection with the first access network provides connectivity to an external data network via a delegated data connection in a mobile communication network and determines to establish connectivity with the external data network via a second access network and sending a request to the mobile communication network via the second access network to establish a second connection with the external data network, wherein the request includes the NAI. Here, the remote unit is not registered with the mobile communication network and the delegated data connection is reserved for use by the remote unit. In various embodiments, the processor controls the transceiver to communicate with the external data network via the second access network using the first network address.

In some embodiments, the processor further authenticates the remote unit with the mobile communication network using credentials associated with the NAI prior to communicating with the external data network via the second access network using the first network address. In such embodiments, the processor uses a first type of authentication signaling to authenticate via the second access network. Moreover, establishing the connection with a first access network by using the NAI may include the processor authenticating with the mobile communication network via the first access network. In such embodiments, the processor uses a second type of authentication signaling to authenticate via the first access network, the second type different than the first type.

In certain embodiments, the request sent to the mobile communication via the second access network to establish the second data connection includes a PDU Session Establishment request and comprises an indication that the second data connection is to replace an existing delegated PDU Session. Here, the delegated data connection is a delegated PDU connection and the second data connection is not a delegated data connection. In some embodiments, the remote unit is configured with a list of one or more access network identities that support delegated data connections to the mobile communication network. In such embodiments, determining that the connection with a first access network provides connectivity to an external data network via a delegated data connection in a mobile communication network is based on an identity of the first access network.

In some embodiments, the processor further discovers an interworking capability of the first access network. In such embodiments, determining that the connection with a first access network provides connectivity to an external data network via a delegated data connection in a mobile communication network is based on the discovered interworking capability. In certain embodiments, the request to establish the second connection is a request for a normal (not delegated) PDU session over NG-RAN. Moreover, the included. NAI triggers the mobile communication network to "substitute" the existing delegated PDU session associated with this NAI with the new PDU session over NG-RAN.

Embodiments may be practiced in other specific forms. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

The invention claimed is:

1. A method comprising:
    receiving, at an apparatus, an access request indicating that a remote unit requires to access a first access network;
    determining to establish a delegated data connection in a mobile communication network for the remote unit connecting the apparatus with an external data network;
    enabling authentication of the remote unit by converting, at the apparatus, a first authentication signaling used by the mobile communication network to a second authentication signaling used by the first access network; and
    forwarding data traffic between the remote unit and the external data network over the delegated data connection in response to successful authentication of the remote unit, wherein the delegated data connection is reserved for use by the remote unit.

2. The method of claim 1, further comprising registering the apparatus with the mobile communication network using a first set of credentials prior to receiving the access request, wherein the remote unit is not registered with the mobile communication network.

3. The method of claim 2, wherein registering the apparatus with the mobile communication network comprising sending an indication that the apparatus supports delegated data connections in the mobile communication network.

4. The method of claim 1, wherein the access request received by the apparatus comprises a network access identifier ("NAI"), wherein the determination to establish the delegated data connection is based on the NAI.

5. The method of claim 1, wherein the access request received by the apparatus indicates a service set identifier ("SSID"), wherein the determination to establish the delegated data connection is based on the SSID.

6. The method of claim 1, wherein the access request received by the apparatus indicates at least one of a data network name ("DNN") and a single network slice selection assistance information ("S-NSSAI"), wherein the determination to establish the delegated data connection is based on the at least one of a DNN and S-NSSAI.

7. The method of claim 1, further comprising transmitting a Protocol Data Unit ("PDU") Session Establishment request to the mobile communication network in response to determining to establish the delegated data connection for the remote unit, wherein the PDU Session Establishment request indicates that the requested PDU Session is for an initial delegated PDU Session.

8. The method of claim 7, wherein the PDU Session Establishment request includes a network access identifier ("NAI") of the remote unit.

9. The method of claim 7, wherein the PDU Session Establishment request includes a session identifier having a special value to indicate that the requested PDU Session is a delegated PDU Session used to carry the data of the remote unit.

10. The method of claim 8, further comprising receiving a PDU Session Resource Setup Request message for the delegated PDU Session, the PDU Session Resource Setup Request message including a PDU Session Establishment Accept message, the NAI of the remote unit and a master session key ("MSK").

11. The method of claim 9, where the MSK is used to protect the data traffic between the remote unit and the first access network.

12. The method of claim 1, further comprising receiving one or more traffic steering rules for data traffic of the remote unit, wherein forwarding data traffic between the remote unit and the external data network over the delegated data connection comprises sending certain data over the delegated data connection based on the one or more traffic steering rules and offloading other data to a local connection.

13. The method of claim 1, further comprising:
receiving an indication that the remote unit is disconnected from the first access network or is not reachable in the first access network; and
sending a Protocol Data Unit ("PDU") Session release request to the mobile communication network, the PDU Session release request including a network access identifier ("NAI") of the remote unit.

14. The method of claim 1, further comprising:
receiving an indication that a Protocol Data Unit ("PDU") Session associated with a network access identifier ("NAI") of the remote unit has been established via a second access network; and
releasing the delegated data connection associated with the NAI and corresponding resources in the first access network.

15. A method comprising:
establishing, by a remote unit, a connection with a first access network by using a network access identifier ("NAI");
receiving a first network address for communication over the first access network;
determining that the connection with the first access network provides connectivity to an external data network via a delegated data connection in a mobile communication network, wherein the remote unit is not registered with the mobile communication network and the delegated data connection is reserved for use by the remote unit;
determining to establish connectivity with the external data network via a second access network;
sending a request to the mobile communication network via the second access network to establish a second connection with the external data network, wherein the request includes the NAI; and
communicating with the external data network via the second access network using the first network address.

16. The method of claim 15, further comprising authenticating the remote unit with the mobile communication network using credentials associated with the NAI prior to communicating with the external data network via the second access network using the first network address, wherein the remote unit uses a first type of authentication signaling to authenticate via the second access network.

17. The method of claim 15, wherein establishing the connection with a first access network by using the NAI comprises the remote unit authenticating with the mobile communication network via the first access network, wherein the remote unit uses a second type of authentication signaling to authenticate via the first access network.

18. The method of claim 15, wherein the request sent to the mobile communication network via the second access network to establish the second connection includes a Protocol Data Unit ("PDU") Session Establishment request and comprises an indication that the second data connection is to replace an existing delegated data connection, wherein the delegated data connection is a delegated PDU Session, wherein the second connection is not a delegated data connection.

19. The method of claim 15, wherein the remote unit is configured with a list of one or more access network identities that support delegated data connections to the mobile communication network, wherein determining that the connection with a first access network provides connectivity to an external data network via a delegated data connection in a mobile communication network is based on an identity of the first access network.

20. The method of claim 15, further comprising discovering an interworking capability of the first access network, wherein determining that the connection with a first access network provides connectivity to an external data network via a delegated data connection in a mobile communication network is based on the discovered interworking capability, wherein the interworking capability includes a list of one or more mobile communication networks with which the first access network can establish delegated data connections.

* * * * *